United States Patent
Smullen

(10) Patent No.: US 10,944,701 B2
(45) Date of Patent: *Mar. 9, 2021

(54) SYSTEMS AND METHODS FOR CHANNEL BASED COMMUNICATION AND ENGAGEMENT THROUGH ADVERTISING UNITS

(71) Applicant: Pypestream Inc., New York, NY (US)

(72) Inventor: Richard Smullen, New York, NY (US)

(73) Assignee: Pypestream Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,920

(22) Filed: Feb. 21, 2020

(65) Prior Publication Data

US 2020/0195592 A1 Jun. 18, 2020

Related U.S. Application Data

(63) Continuation of application No. 16/031,942, filed on Jul. 10, 2018, now Pat. No. 10,601,745, which is a
(Continued)

(51) Int. Cl.
  *G06F 15/16* (2006.01)
  *H04L 12/58* (2006.01)
  (Continued)

(52) U.S. Cl.
  CPC ....... *H04L 51/046* (2013.01); *G06Q 30/0251* (2013.01); *H04L 12/185* (2013.01);
  (Continued)

(58) Field of Classification Search
  CPC ....... H04L 51/046; H04L 51/02; H04L 51/32; H04L 51/14; H04L 51/36; H04L 67/306;
  (Continued)

(56) References Cited

U.S. PATENT DOCUMENTS

| 6,044,142 A | 3/2000 | Hammarstrom et al. |
| 8,122,084 B2 * | 2/2012 | Beringer ................ G06Q 10/10 709/204 |

(Continued)

FOREIGN PATENT DOCUMENTS

CA  2 884 775 A1  3/2013

OTHER PUBLICATIONS

International Search Report for International Patent Application No. PCT/US2016/024373, dated Jul. 12, 2016, 15 pages.

*Primary Examiner* — Ruolei Zong
(74) *Attorney, Agent, or Firm* — Morgan, Lewis & Bockius LLP

(57) ABSTRACT

Responsive to a search query received from a remote user device, retrieve one or more channel based communication and engagement objects (CBCEO). Each CBCEO comprises a primary communication channel which is associated with an enterprise data source. Each primary communication channel facilitates electronic communication between the respective enterprise data source of the primary communication channel and users. The one or more retrieved CBCEO are integrated into an advertising unit of a data source. The advertising unit is rendered on a display page by the data source to a display of the user device. An enterprise data source is selected via the one or more CBCEO of the rendered advertising unit from the user device and a secure bidirectional conversation is established. The secure bidirectional conversation comprises an exchange of messages between the user device and the enterprise data source through a primary communication channel of the enterprise data source.

20 Claims, 16 Drawing Sheets

Related U.S. Application Data continuation-in-part of application No. 15/452,486, filed on Mar. 7, 2017, now Pat. No. 10,187,337, which is a continuation-in-part of application No. 15/294,368, filed on Oct. 14, 2016, now Pat. No. 9,647,968, which is a continuation-in-part of application No. 15/269,697, filed on Sep. 19, 2016, now Pat. No. 9,641,470, which is a continuation of application No. 15/081,766, filed on Mar. 25, 2016, now Pat. No. 9,450,901.

(60) Provisional application No. 62/547,680, filed on Aug. 18, 2017, provisional application No. 62/407,873, filed on Oct. 13, 2016, provisional application No. 62/265,988, filed on Dec. 11, 2015, provisional application No. 62/264,850, filed on Dec. 8, 2015, provisional application No. 62/137,843, filed on Mar. 25, 2015.

(51) Int. Cl.
| | |
|---|---|
| *H04L 12/18* | (2006.01) |
| *H04L 29/06* | (2006.01) |
| *H04L 29/08* | (2006.01) |
| *H04W 4/23* | (2018.01) |
| *G06Q 30/02* | (2012.01) |
| *H04W 4/021* | (2018.01) |

(52) U.S. Cl.
CPC .............. *H04L 51/02* (2013.01); *H04L 63/18* (2013.01); *H04L 67/02* (2013.01); *H04L 67/322* (2013.01); *H04L 69/14* (2013.01); *H04W 4/021* (2013.01); *H04W 4/23* (2018.02); *H04L 67/306* (2013.01); *H04L 67/42* (2013.01); *Y02D 30/50* (2020.08)

(58) Field of Classification Search
CPC ... H04L 67/18; H04L 63/104; H04L 12/1859; H04L 12/5855; G06F 17/30867
USPC .......................................................... 709/206
See application file for complete search history.

(56) References Cited

U.S. PATENT DOCUMENTS

| | | | |
|---|---|---|---|
| 8,677,451 B1 | 3/2014 | Bhimaraju et al. | |
| 9,240,970 B2* | 1/2016 | Holzman | H04L 12/1822 |
| 9,450,901 B1 | 9/2016 | Smullen et al. | |
| 9,641,470 B2 | 5/2017 | Smullen et al. | |
| 9,647,968 B2 | 5/2017 | Smullen et al. | |
| 9,948,583 B2 | 1/2018 | Smullen et al. | |
| 10,187,337 B2 | 1/2019 | Smullen et al. | |
| 2003/0023691 A1* | 1/2003 | Knauerhase | H04L 51/04 709/206 |
| 2003/0028451 A1 | 2/2003 | Ananian | |
| 2003/0055907 A1 | 3/2003 | Stiers | |
| 2005/0080862 A1* | 4/2005 | Kent, Jr. | G06Q 10/107 709/206 |
| 2005/0102401 A1 | 5/2005 | Patrick et al. | |
| 2006/0036671 A1 | 2/2006 | Rhim et al. | |
| 2006/0036679 A1 | 2/2006 | Goodman et al. | |
| 2007/0192414 A1* | 8/2007 | Chen | H04L 67/02 709/205 |
| 2007/0206086 A1 | 9/2007 | Baron et al. | |
| 2008/0104244 A1 | 5/2008 | Chen et al. | |
| 2010/0064015 A1 | 3/2010 | Sacks et al. | |
| 2010/0114938 A1* | 5/2010 | Weng | G06F 16/9535 707/769 |
| 2012/0089698 A1* | 4/2012 | Tseng | G06Q 10/101 709/217 |
| 2013/0191481 A1* | 7/2013 | Prevost | H04L 51/14 709/206 |
| 2014/0280936 A1 | 9/2014 | Nandagopal et al. | |
| 2015/0310446 A1* | 10/2015 | Tuchman | G06Q 30/016 705/304 |
| 2018/0212904 A1 | 7/2018 | Smullen et al. | |

* cited by examiner

530 — Responsive to the selection of the first enterprise data source, establish a first secure bidirectional conversation. This conversation comprises an exchange of a first plurality of messages between the first remote user device and the first enterprise data source through a first primary communication channel of the first enterprise data source.

532 — The first plurality of messages in the first secure bidirectional conversation between the first remote user device and the first enterprise data source associated with the first primary communication channel comprises a first message posted by the first enterprise data source. The first message is associated with a first application programming interface token identifying a first user associated with the first remote user device.

534 — The first primary communication channel further hosts a second plurality of messages in a second secure bidirectional conversation between a second remote user device associated with a second user and the first enterprise data source. The second plurality of messages comprises a second message posted by the first enterprise data source. The second message is associated with the second application programming interface token identifying the second user associated with the second remote user device. The first application programming interface token is used to route the first message to the first remote user device within the first primary communication channel. The second application programming interface token is used to route the second message to the second remote user device within the first primary communication channel.

536 — Use an automated human interface module to parse a reply from the first user to the first message. When the automated human interface module is unable to find a matching response to the reply from the first user, the automated human interface module refers the first user to a human operator associated with the first primary communication channel. When the automated human interface module is able to find a matching response to the reply from the first user, the automated human interface module provides the matching response to the first user by providing the matching response along with the first application programming interface token identifying the first user associated with the first remote user device.

Fig. 5D

538 — Receive a location of a second remote user device associated with a second user within the first primary communication channel. Determine whether the location is within a geographical zone in a plurality of geographical zones. When the location is within a geographical zone in the geographical plurality of zones, communicate information from the first enterprise data source to the remote user device associated with the second user within the first primary communication channel based, at least in part, on the location. When the location is not within a geographical zone in the geographical plurality of zones, communicate no information from the first enterprise data source to the remote user device associated with the second user within the first primary communication channel.

540 — The first primary communication channel hosts five or more conversations. Each conversation is between the first enterprise data source and a different user in the plurality of users associated with the first primary communication channel.

542 — The first primary communication channel hosts 100 or more conversations, each conversation between the first enterprise data source and a different user in the plurality of users associated with the first primary communication channel.

544 — The first primary communication channel facilitates electronic payment processing, customer sign-up, marketing messages or campaigns, or customer service.

546 — A communication is further established between the remote user device and a representative of the selected enterprise data source.

548 — The representative of the selected enterprise data source is a call center agent or an intelligent automation chat-bot.

550 — The communication is established through a channel based communication and engagement object of the selected enterprise data source upon conclusion of the established bidirectional communication between the remote user device and the selected enterprise data source.

Fig. 5E

```
{
  "$schema": "http://json-schema.org/draft-04/schema#",
  "type": "object",
  "properties": {
    "business_id": {
      "type": "string",
      "description": "Unique identifier representing a specific consumer."
    },
    "name": {
      "type": "string",
      "description": "Business' name"
    },
    "super_admin_id": {
      "type": "string",
      "description": "Super_admin that administers the company."
    },
    "pype_admins": {
      "type": "array",
      "description": "A list of pype_admins within the business"
    },
    "stream_admins": {
      "type": "array",
      "description": "A list of stream_admins within the business"
    }
  },
  "required": [
    "name"
  ]
}
```

208 — (labels: 374 business_id, 376 name, 378 super_admin_id, 380 pype_admins, 392 stream_admins)

Fig. 8

SYSTEMS AND METHODS FOR CHANNEL BASED COMMUNICATION AND ENGAGEMENT THROUGH ADVERTISING UNITS

CROSS-REFERENCE TO RELATED APPLICATIONS

This application is a continuation of U.S. patent application Ser. No. 16/031,942, entitled "Systems and Methods for Channel Based Communication and Engagement Through Advertising Units," filed Jul. 10, 2019, which claims priority to U.S. Provisional Patent Application No. 62/547,680, entitled "Channel Based Communication and Engagement Through Advertising Units," filed Aug. 18, 2017, each of which is hereby incorporated by reference in its entirety.

This application also claims priority to U.S. patent application Ser. No. 15/452,486 entitled "Systems and Methods for Invoking Chatbots in a Channel Based Communication System," filed Mar. 7, 2017, which claims priority to U.S. Pat. No. 9,647,968 entitled "Systems and Methods for Invoking Chatbots in Channel Based Communication System," filed Oct. 14, 2016, which claims priority to U.S. Provisional Patent Application No. 62/407,873 entitled "Systems and Methods for Invoking Chatbots in Channel Based Communication System," filed Oct. 13, 2016, each of which is hereby incorporated by reference in its entirety.

This application also claims priority to U.S. Pat. No. 9,641,470 entitled "Channel Based Communication and Transaction System," filed Sep. 19, 2016, which claims priority to U.S. Pat. No. 9,450,901 entitled "Channel Based Communication and Transaction System," filed Mar. 25, 2016, which claims priority to U.S. Provisional Patent Application No. 62/137,843, entitled "Channel Based Communication and Transaction System," filed Mar. 25, 2015, U.S. Provisional Patent Application No. 62/265,988, entitled "Bidirectional Communication And Message Processing," filed Dec. 11, 2015, and U.S. Provisional Patent Application No. 62/264,850, entitled "Message Aggregation and Processing," filed Dec. 8, 2015, each of which is hereby incorporated by reference in its entirety.

TECHNICAL FIELD

The present disclosure relates generally to enterprise data sources and advertising units thereof. More particularly, the present disclosure relates to systems and methods for providing channel based access of enterprise data sources provided to user through advertising units.

BACKGROUND

Enterprise data sources use different types of communication systems to communicate with and engage users, such as consumers. For example, many enterprise data sources rely on advertisements to drive user engagement (e.g., web traffic), generate a sales lead, or facilitate a transaction. Recently, an increasing number of enterprises have been directing their marketing efforts towards online advertisements and search engine optimization. However, advertisements conveyed through the Internet often do not reflect the interests of the user the advertisement is attempting to capture. For instance, users often search the Internet for a specific topic (e.g., tennis shoes) and explore webpages related to the topic. Unfortunately, a vast majority of advertisements generated on the webpages related to the topic are not associated with the topic itself (e.g., advertisements for cat food on a webpage for tennis equipment). This creates lost opportunities for both the provider of the irrelevant advertisement as well as potential providers of more relevant advertisements. Thus, typical communication and engagement systems do not facilitate direct and relatable advertisements to users.

Given the above background, there is a need in the art for computer implemented systems and methods that improve communication and user engagement through advertising units.

The information disclosed in this Background section is only for enhancement of understanding of the general background of the invention and should not be taken as an acknowledgement or any form of suggestion that this information forms the prior art already known to a person skilled in the art.

SUMMARY

Advantageously, the systems and methods for providing channel based communication and engagement through advertising units detailed in the present disclosure address the shortcomings discussed above.

Accordingly, various aspects of the present disclosure are directed to providing systems and methods for providing channel based communication and engagement through advertising units.

One aspect of the present disclosure provides a channel based communication and engagement system (CBCES). Responsive to a search query received from a first remote user device associated with a first user, the method retrieves one or more channel based communication and engagement objects (CBCEO). Each respective channel based communication and engagement object comprises a primary communication channel. Each primary communication channel is associated with a corresponding enterprise data source in a plurality of enterprise data sources. Furthermore, each respective primary communication channel is configured to facilitate electronic communication between the respective enterprise data source of the primary communication channel and a different plurality of users. The one or more retrieved channel based communication and engagement objects are integrated into an advertising unit of a data source. The advertising unit, which comprises the integrated channel based communication and engagement objects, is rendered on a display page. The display page is rendered by the data source to a display of the remote user device. A first enterprise data source is selected by way of the one or more channel based communication and engagement objects of the rendered advertising unit from the user device. Responsive to this selection, a secure bidirectional conversation is established. The secure bidirectional conversation comprises an exchange of messages between the remote user device and the enterprise data source. The exchange of messages is through a first primary communication channel of the enterprise data source.

In some embodiments, the search query comprises one or more keywords. The one or more keywords are utilized to associated the search query, enterprise data sources, and channel based communication and engagement objects together.

In some embodiments, the retrieving of the one or more channel based communication and engagement objects further comprises extracting one or more keywords of the search query (e.g., extracting a keyword "golf" from a search query for "discount golf clubs"). Responsive to each of the extracted keywords, a corresponding channel based communication and engagement object is retrieved.

In some embodiments, a keyword in the one or more keywords is a target mechanism. The target mechanism is configured to prevent a predetermined channel based communication engagement object, which accordingly comprises a predetermined primary communication channel, from being retrieved.

In some embodiments, upon retrieving the one or more channel based communication and engagement objects, a list of one or more enterprise data sources is generated. The list comprises each enterprise data source and corresponding primary communication channel of the one or more enterprise data sources associated with the retrieved channel based communication and engagement objects. Responsive to the search query, the channel based communication and engagement objects are selected without human intervention from the list.

In some embodiments, at least one of the retrieved channel based communication and engagement objects is obtained from a third-party server (e.g., an advertising server).

In some embodiments, the channel based communication and engagement system is associated with a plurality of keywords of the enterprise data source (e.g., the channel based communication and engagement system is associated with internet service provider and wireless network carrier enterprise data sources, or the channel based communication and engagement system is associated with sport club and sporting equipment enterprise data sources).

In some embodiments, the advertising unit is a standard interactive advertising bureau (IAB) advertising unit.

In some embodiments, a communication is further established between the remote user device and a representative of the selected enterprise data source. In some embodiments, the representative of the selected enterprise data source is a call center agent or an intelligent automation chat-bot.

In some embodiments, the communication is established through a channel based communication and engagement object of the selected enterprise data source. This communication is established upon conclusion of the established bidirectional communication between the remote user device and the selected enterprise data source.

In some embodiments, the messages in the secure bidirectional conversation between the first remote user device and the first enterprise data source associated with the first primary communication channel comprise a first message posted by the first enterprise data source. The first message is associated with a first application programming interface (API) token identifying a first user associated with the first remote user device.

In some embodiments, the first primary communication channel further hosts messages in another secure bidirectional conversation. This secure bidirectional conversation is between a second remote user device associated with a second user and the first enterprise data source. These messages include a second message posted by the first enterprise data source. The second message is associated with a second application programming interface token identifying the second user associated with the second remote user device. The method uses the first application programming interface token to route the first message to the first remote user device within the first primary communication channel. The second application programming interface token is used to route the second message to the second remote user device within the first primary communication channel.

In some embodiments, the first primary communication channel hosts five or more conversations. In some embodiments, the first primary communication channel hosts a ten or more conversations. In some embodiments, the first primary communication channel hosts a hundred or more conversations. In some embodiments, the first primary communication channel hosts a thousand or more conversations. Each conversation is between the first enterprise data source and a different user associated with the first primary communication channel.

In some embodiments, the first primary communication channel facilitates electronic payment processing, customer sign-up, marketing messages or campaigns, or customer service.

In some embodiments, the first enterprise data source is a store, a chain of stores, a government institution or service, a company, a corporation, an enterprise, an advertising firm, a restaurant, a healthcare organization, an organization, or a social organization.

In some embodiments, the method uses an automated human interface module to parse a reply from the first user to the first message. When the automated human interface module is unable to find a matching response to the reply from the first user, the automated human interface module refers the first user to a human operator associated with the first primary communication channel. When the automated human interface module is able to find a matching response to the reply from the first user, the automated human interface module provides the matching response to the first user by providing the matching response along with the first application programming interface token identifying the first user associated with the first remote user device. In some embodiments, the human operator associated with the first primary communication channel is a representative of the selective In some embodiments, the method receives a location of another remote user device associated with a second user within the first primary communication channel. The method determines whether the location is within a geographical zone in a plurality of geographical zones. When the location is within a geographical zone in the geographical plurality of zones, the method communicates information from the first enterprise data source to the remote user device associated with the second user. This information is communicated within the first primary communication channel based, at least in part, on the location. When the location is not within a geographical zone in the geographical plurality of zones, the method further communicates no information from the first enterprise data source to the remote user device associated with the second user within the first primary communication channel.

Another aspect of the present disclosure provides a non-transitory computer readable storage medium for channel based communication and engagement. The non-transitory computer readable storage medium stores instructions, which when executed, in response to a search query received from a first remote user device associated with a first user, retrieves one or more channel based communication and engagement objects. Each respective channel based communication and engagement object comprises a primary communication channel. Each primary communication channel is associated with a corresponding enterprise data source in a plurality of enterprise data sources. Each respective channel based communication and engagement object comprises a primary communication channel. Each primary communication channel is associated with a corresponding enterprise data source in a plurality of enterprise data sources. Each respective primary communication channel is configured to facilitate electronic communication between the respective enterprise data source of the primary communication channel and a different plurality of users. The one or more retrieved channel based communication and engagement objects are integrated into an advertising unit of a data source. The advertising unit, which comprises the integrated channel based communication and engagement objects, is rendered on a display page. The display page is rendered by the data source to a display of the first remote user device. A first enterprise data source is selected by way of the one or more channel based communication and engagement objects of the rendered advertising unit from the user device. Responsive to this selection, a secure bidirectional conversation is established. The secure bidirectional conversation comprises an exchange of messages between the remote user device and the enterprise data source. The exchange of messages is through a first primary communication channel of the enterprise data source.

Another aspect of the present disclosure provides a channel based communication and engagement computer system. The system comprises one or more processors, memory, and one or more programs stored in the memory for execution by the one or more processors. The one or more programs comprise instructions for, responsive to a search query received from a first remote user device associated with a first user, retrieving one or more channel based communication and engagement objects. Each respective channel based communication and engagement object comprises a primary communication channel. Each primary communication channel is associated with a corresponding enterprise data source in a plurality of enterprise data sources. Each respective primary communication channel is configured to facilitate electronic communication between the respective enterprise data source of the primary communication channel and a different plurality of users. The one or more retrieved channel based communication and engagement objects are integrated into an advertising unit of a data source. The advertising unit, which comprises the integrated channel based communication and engagement objects, is rendered on a display page. The display page is rendered by the data source to a display of the first remote user device. A first enterprise data source is selected by way of the one or more channel based communication and engagement objects of the rendered advertising unit from the user device. Responsive to this selection, a secure bidirectional conversation is established. The secure bidirectional conversation comprises an exchange of messages between the remote user device and the enterprise data source. The exchange of messages is through a first primary communication channel of the enterprise data source.

BRIEF DESCRIPTION OF THE DRAWINGS

FIGS. 5A, 5B, 5C, 5D, and 5E collectively provide a flow chart of processes and features of a system for channel based communication and engagement through advertising units, and in so doing, establishing secure bidirectional communication with enterprise data sources, in accordance with various embodiments of the present disclosure. In these figures, elements in dashed boxes are optional.

FIG. 8 illustrates an enterprise data source description for an enterprise data source in accordance with some embodiments of the present disclosure.

Figure 1:
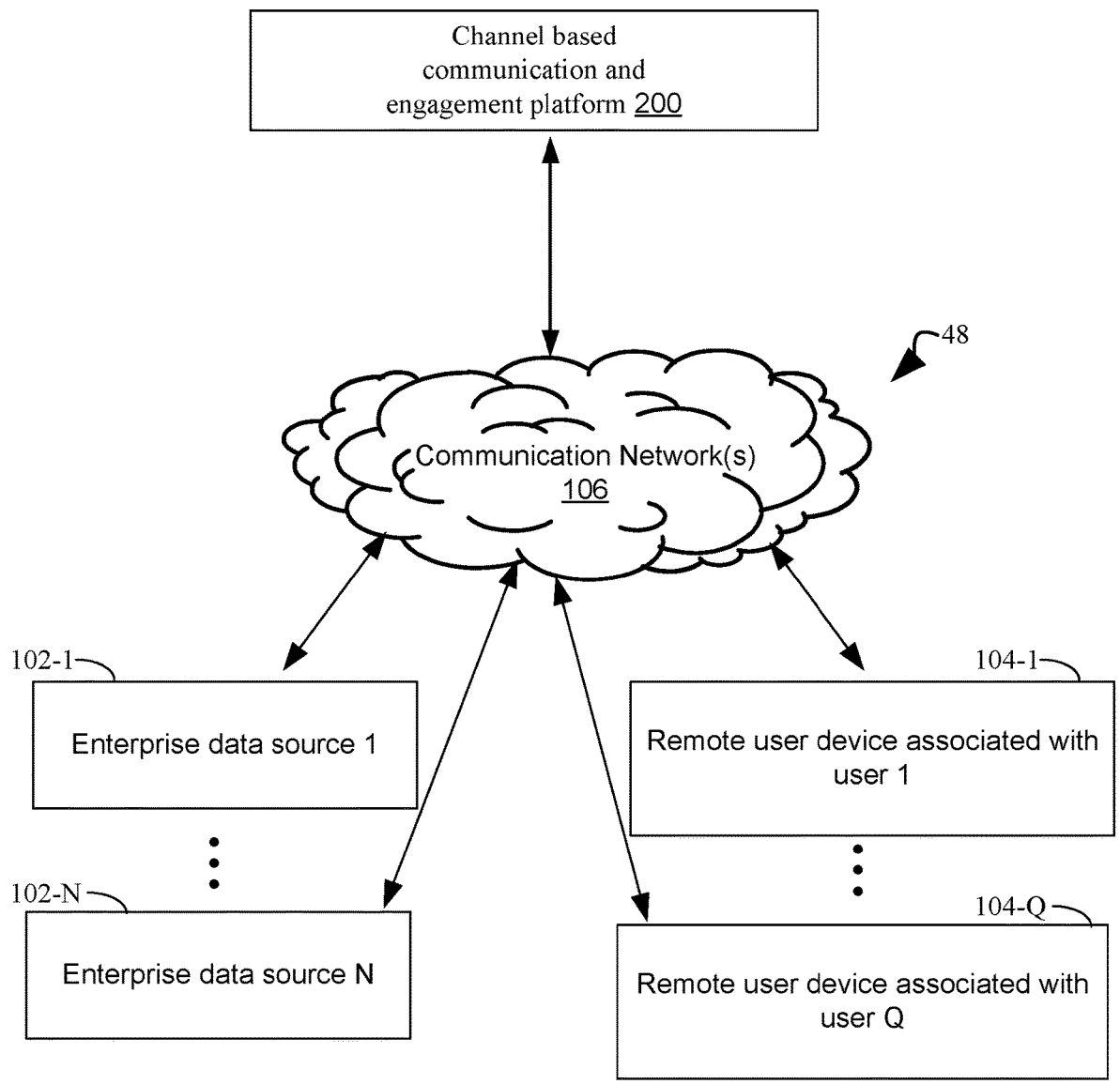
FIG. 1 illustrates a system topology that includes a channel based communication and engagement system, a plurality of remote user devices associated with users of the channel based communication and engagement system, and a plurality of enterprise data sources that communicate with the plurality of users through primary communication channels using the channel based communication and engagement system in accordance with an aspect of the present disclosure.

The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to implementations, examples of which are illustrated in the accompanying drawings. In the following detailed description of implementations, numerous specific details are set forth in order to provide a thorough understanding of the present invention. However, it will be apparent to one of ordinary skill in the art that the present invention may be practiced without these specific details.

It will also be understood that, although the terms first, second, etc. may be used herein to describe various elements, these elements should not be limited by these terms. These terms are only used to distinguish one element from another. For example, a first user could be termed a second user, and, similarly, a second user could be termed a first user, without departing from the scope of the present disclosure. The first user and the second user are both users, but they are not the same user. Furthermore, the terms "subject," "end user," and "user" are used interchangeably herein.

The terminology used in the present disclosure is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Systems and methods for channel based communication and engagement through advertising units comprise a search query received from a remote user device. Response to this, one or more channel based communication and engagement objects (CBCEO) are retrieved. Each CBCEO is a software object comprises a primary communication channel. Each primary communication channel facilitates electronic communication between a corresponding enterprise data source of the primary communication channel and various users. The retrieved CBCEOs are integrated into an advertising unit of a data source (e.g., a networked location). The advertising unit is rendered on a display page (e.g., a webpage) by the data source to a display of the user device. An enterprise data source is selected via the one or more CBCEO of the rendered advertising unit from the user device and a secure bidirectional conversation is established. The secure bidirectional conversation includes an exchange of messages between the user device and the enterprise data source through a primary communication channel of the enterprise data source.

Figure 2:
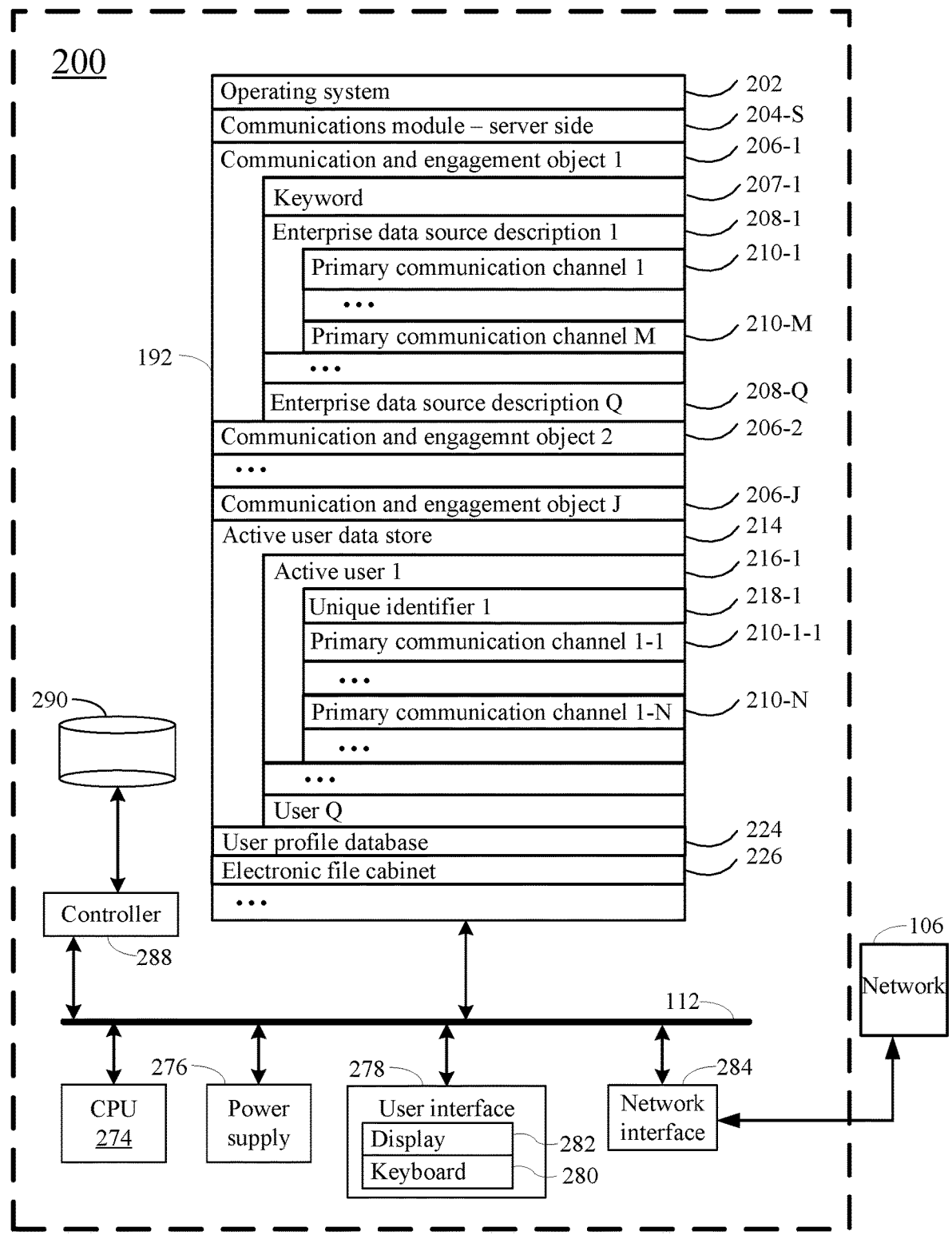
FIG. 2 illustrates a channel based communication and engagement system in accordance with an embodiment of the present disclosure.
Figure 3:
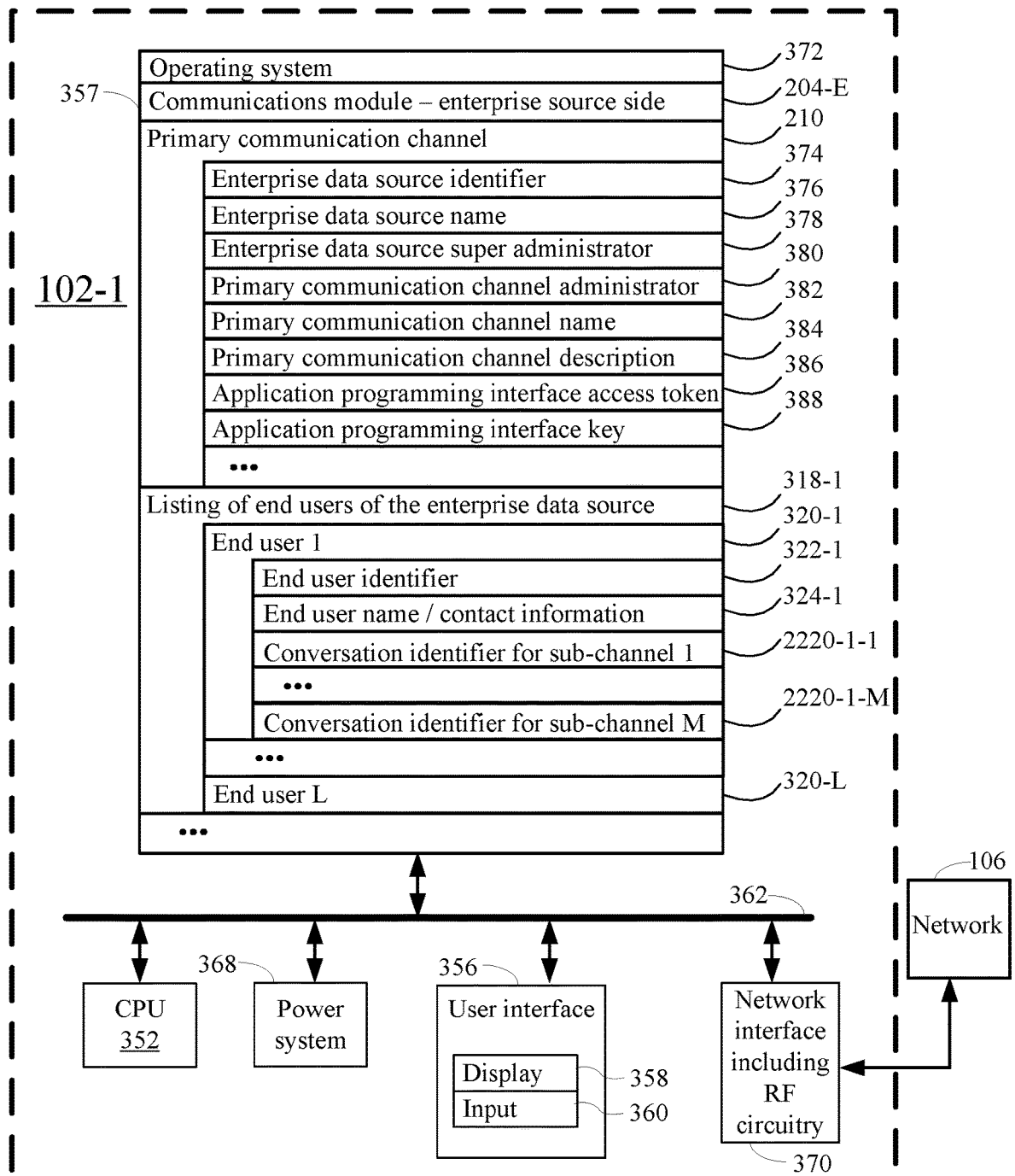
FIG. 3 illustrates an enterprise data source, in accordance with an embodiment of the present disclosure.
Figure 4:
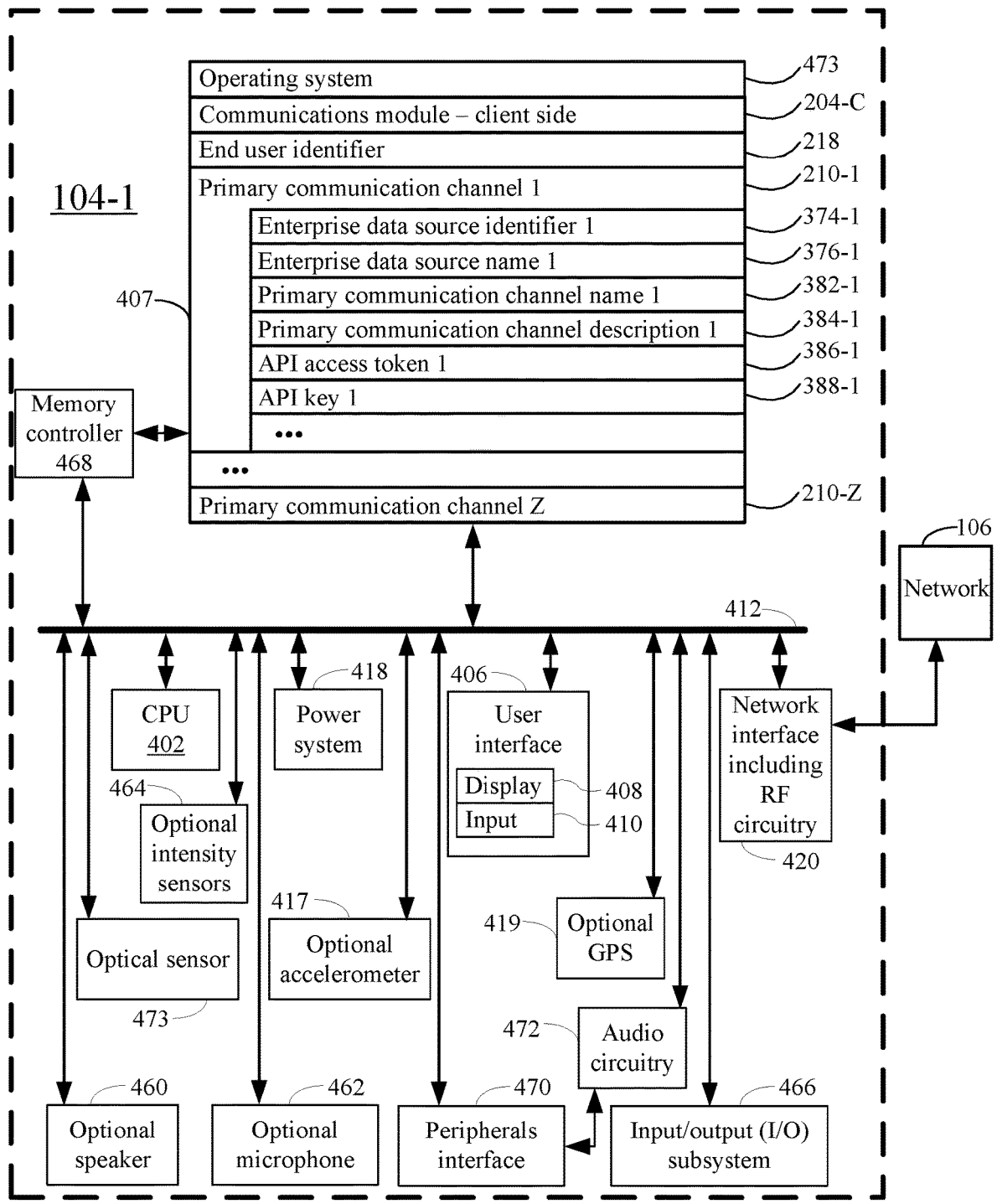
FIG. 4 illustrates a remote user device, in accordance with an embodiment of the present disclosure.
Figure 5A:
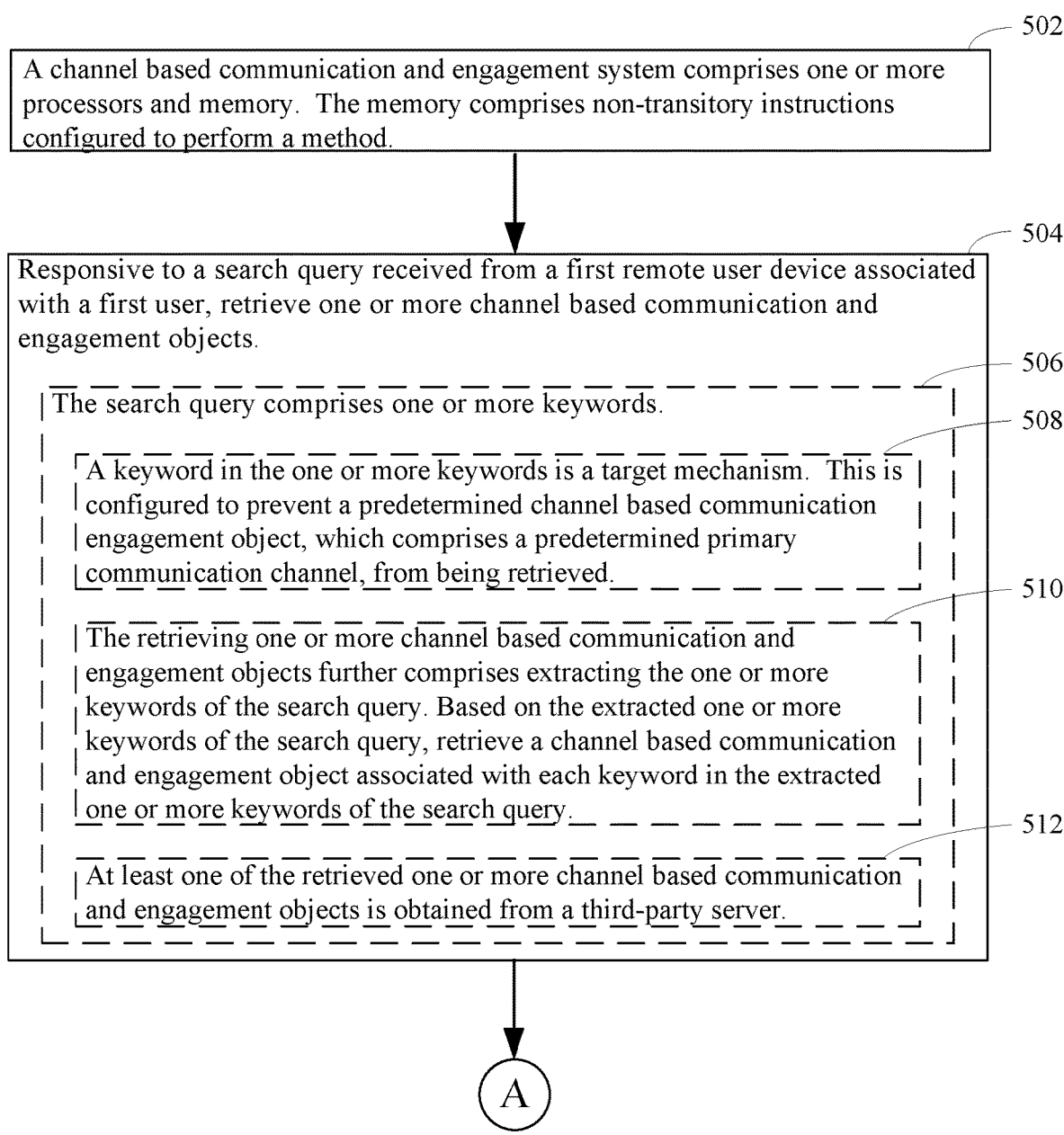
Figure 5B:
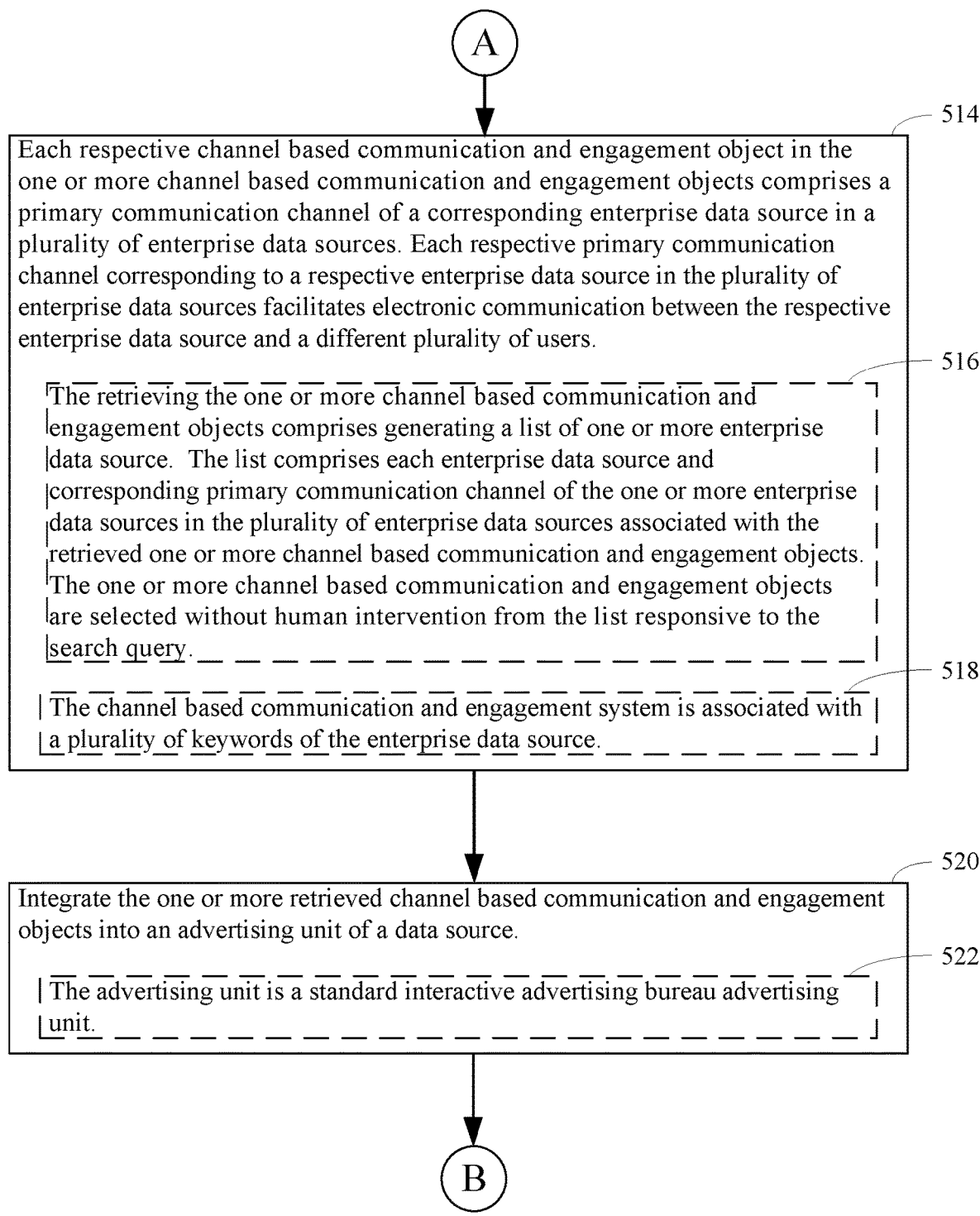
Figure 5C:
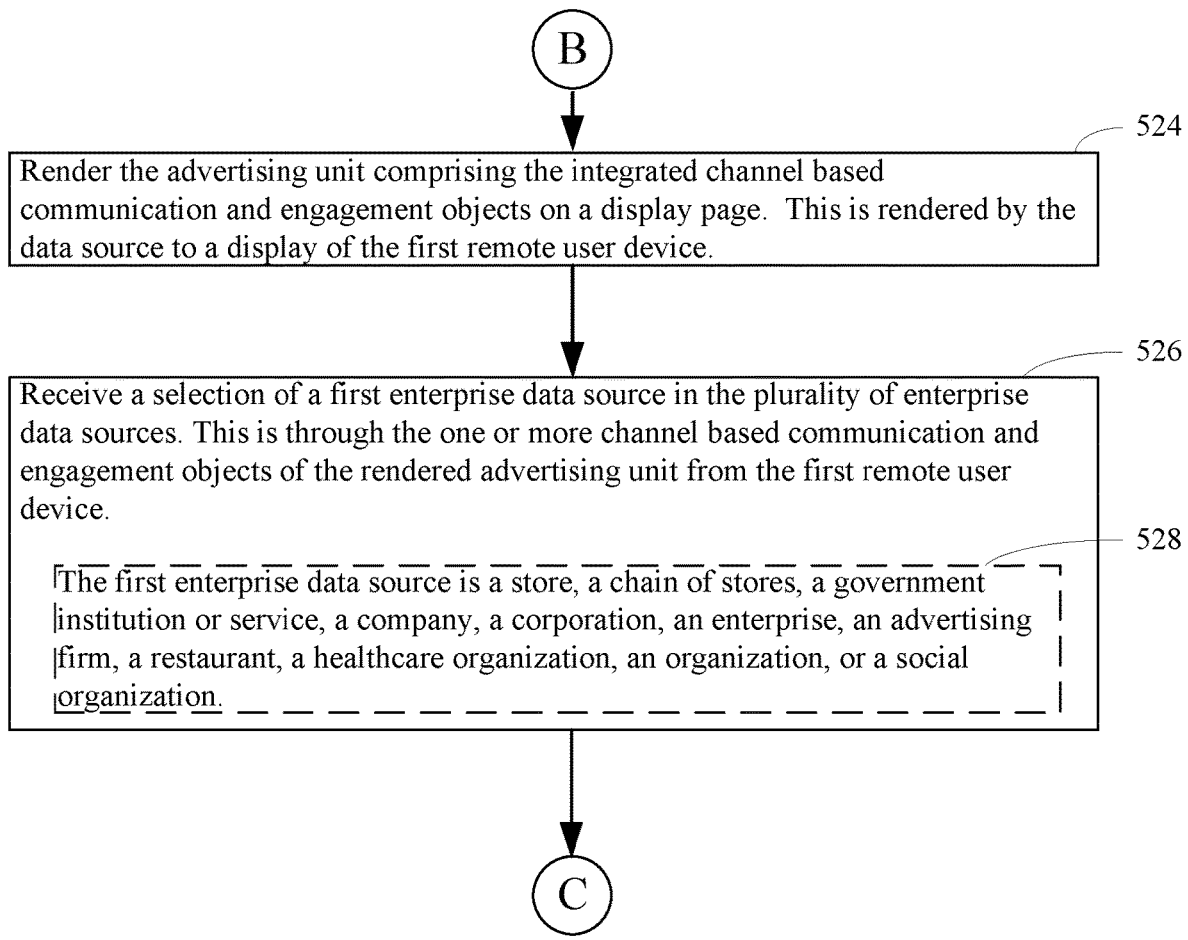

A detailed description of a system 48 that enables bidirectional communication between users and enterprise data sources through channel based communication and engagement objects in accordance with the present disclosure is described in conjunction with FIGS. 1 through 4. As such, FIGS. 1 through 4 collectively illustrate the topology of the system in accordance with the present disclosure. In the topology, there is a channel based communication and engagement platform 200 (FIGS. 1 and 2), enterprise data sources 102 that provide customer services and products to users through the channel based communication and engagement platform 200 (FIGS. 1 and 3), and remote user devices 104 associated with users that consume such customer services and products (FIGS. 1 and 4).

Of course, other topologies of system 48 are possible, for instance, channel based communication and engagement platform 200 can in fact constitute several computers that are linked together in a network or be a virtual machine or a container in a cloud computing context. As such, the exemplary topology shown in FIG. 1 merely serves to describe the features of an embodiment of the present disclosure in a manner that will be readily understood to one of skill in the art. For instance, in some embodiments the channel based communication and engagement platform 200 and the enterprise data sources 102 are subsumed by the channel based communication and engagement system 48.

Referring to FIG. 2, in typical embodiments, a channel based communication and engagement platform 200 comprises one or more computers. For purposes of illustration in FIG. 2, the channel based communication and engagement platform 200 is represented as a single computer that includes all of the functionality of the channel based communication and engagement platform 200. However, the disclosure is not so limited. The functionality of the channel based communication and engagement platform 200 may be spread across any number of networked computers and/or reside on each of several networked computers and/or by hosted on one or more virtual machines and/or containers at a remote location accessible across the communications network 106. One of skill in the art will appreciate that a wide array of different computer topologies are possible for the channel based communication and engagement platform 200 and all such topologies are within the scope of the present disclosure.

Turning to FIG. 2 with the foregoing in mind, a channel based communication and engagement platform 200 comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to the channel based communication and engagement platform 200 but that can be electronically accessed by the channel based communication and engagement system over an Internet, intranet, or other form of network or electronic cable (illustrated as element 106 in FIG. 2) using network interface 284.

The memory 192 of the channel based communication and engagement platform 200 stores:

an operating system 202 (e.g., iOS, DARWIN, RTXC, LINUX, UNIX, OS X, WINDOWS, or an embedded operating system such as VxWorks) that includes procedures for handling various basic system services;

a communications module 204-S for supporting bidirectional secure communications between the channel based communication and engagement platform 200, enterprise data sources 102 and remote user devices 104;

one or more communication and engagement objects (CBCEO) 206—software objects configured to include enterprises data source descriptions 208 of the enterprises data sources 102 that are available to users of the remote user devices 104, including for each respective enterprise data source the associated primary communication channel 210, as well as an optional keyword 207 associated with the communication and engagement object;

an active user data store 214 that tracks the current active users 216 of the channel based communication and engagement system, including for each such user a unique identifier 218, and their active primary communication channels 220, and in some embodiments, the conversation identifiers of the conversations of the active users;

a user profile database 224 that stores a user profile for each user; and an optional electronic file cabinet 226 which stores attachments sent in to users.

In some embodiments, communications module 204-S is a web application. Advantageously, in such embodiments, since it is a web application it is accessible on any browser (phone, tablet, laptop/desktop) such as remote user device 104 of FIGS. 1 and 4. In some embodiments communications module 204 runs on native device frameworks, and is available for download onto remote user device 104 running operating systems (e.g., iOS, DARWIN, RTXC, LINUX, UNIX, OS X, WINDOWS, or an embedded operating system such as VxWorks).

Enterprise data sources refer to entities that engage with users and provide services and/or products to the users. These entities include, but are not limited to, small and large enterprises, a store (e.g., a local business), a chain of stores (e.g., a franchise), a government institution (e.g., a public transportation service), a company, a corporation, an advertising firm, a restaurant, a healthcare organization or healthcare provider, a social organization or social club, etc.

A CBCEO is a software object or combination of software objects. Software objects are compilations of one or more variables (e.g., one or more fields) and the related one or more methods (e.g., functions) associated with a specific task of the software. The software object (e.g., the CBCEO) includes the primary communication channels 210 of enterprise data sources 102. As will be described infra, a CBCEO can be integrated with other CBCEOs to form an advertising unit of a data source or can standalone as a single advertisement of the data source.

A data source is a networked location that maintains a collection or compilation of one or more webpages. For instance, in some embodiments, the data source is a website such as the Google® search engine of Google Inc., the Yahoo! search engine of Yahoo! Inc., the Bing® search engine of Microsoft Corporation Inc., etc.

In some embodiments, primary communication channels 210 support channel based bidirectional communication, which is a two-way, duplex, communication, for example, a business to consumer (B2C) communication. The channel based bidirectional communication comprises communication of content associated with multiple topics or subjects via multiple primary communication channels 210. Furthermore, the channel based bidirectional communication comprises performance of one or more transactions via the primary communication channels. In some embodiments, primary communication channels 210 are configured for mobile chat that replaces electronic mail (email) for business to consumer communication. This mobile chat takes the form of conversations, each having a conversation identifier, and each limited to the enterprise data source and a single end user. In some embodiments, the mobile chat conversations are identified by way of the unique identifier 218 of the user. In some embodiment, the primary channels 210 are implemented in a cloud computing environment. As used herein, "cloud computing environment" refers to a processing environment comprising configurable computing physical and logical resources, for example, networks, servers, storage, applications, services, etc., and data distributed over a network, for example, the Internet. The cloud computing environment provides on-demand network access to a shared pool of the configurable computing physical and logical resources. Furthermore, in some embodiments the primary communication channels 210 are searchable in a list or a catalog.

In some embodiments, one or more of the above identified data elements or modules of the channel based communication and engagement platform 200 is stored in one or more of the previously described memory devices, and correspond to a set of instructions for performing a function described above. The above-identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 206 stores additional modules and data structures not described above.

Referring to FIG. 3, in some embodiments an enterprise data source 102 includes a server computer having one or more processing units (CPU's) 352, a network or other communications interface 370, a memory 357 (e.g., random access memory), a user interface 356, the user interface 356 including a display 358 and input 360 (e.g., keyboard, keypad, touch screen), one or more communication busses 362 for interconnecting the aforementioned components, and a power system 368 for powering the aforementioned components. It should be appreciated that the enterprise data source 102 depicted in FIG. 3 is only one example of an enterprise data source, and that the enterprise data source 102 optionally has more or fewer components than shown in FIG. 3, optionally combines two or more components, or optionally has a different configuration or arrangement of the components. Moreover, it will be appreciated that an enterprise data source 102 may use any number of computers to support the disclosed systems and methods. The various components shown in FIG. 3 are implemented in hardware, software, firmware, or a combination thereof, including one or more signal processing and/or application specific integrated circuits.

As illustrated in FIG. 3, memory 357 of the enterprise data source 102 preferably comprises:

an operating system 372 (e.g., iOS, DARWIN, RTXC, LINUX, UNIX, OS X, WINDOWS, or an embedded operating system such as VxWorks) that includes procedures for handling various basic system services;

a communications module 204-E for supporting bidirectional secure communication between the channel based communication and engagement platform 200, enterprise data sources 102 and end users associated with remote user devices 104;

a primary communication channel 210 associated with the enterprise data source that includes a unique enterprise data source identifier 374, a name 376, one or more super administrators 378, one or more primary communication channel administrators 380, a primary communication channel name 382, a primary communication channel description 384, an application programming interface access token 386, and an application programing interface key 388; and a listing of a plurality of end users of the enterprises data source 318, including for each such respective end user 320, a user identifier 322, an end user name 324, and an identification of each conversation 2220 (e.g., see FIG. 11 for example additional disclosure on conversations) the end user is participating in.

Thus, FIG. 3 details a primary communication source 102 (e.g., enterprise data source) which includes a primary communication channel 210. End users associated with remote user devices 104 participate in conversations in the primary communication channel 210. Each such conversation is between a single end user and the enterprise data source 102. However, the primary communication channel 210 may host a plurality of such conversations. In some embodiments, to ensure the privacy of these conversations, each conversation 2220 has an identifier and only one end user has access rights to the conversation whereas the enterprise data source 102 has access rights to all the conversations. In some embodiments, message privacy is ensured by way of a user identifier 322 associated with each conversation 2220 or messages therein. In some embodiments, a primary communication channel 210 hosts five or more conversations 2220, ten or more conversations 2220, one hundred or more conversations 2220, or one thousand or more conversations 2220.

FIG. 4 provides a description of a remote user device 104 associated with an end user in accordance with the present disclosure. Remote user device 104 has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 104 (e.g., a touch-sensitive surface such as a touch-sensitive display system 408 of the device 102), optional input/output (I/O) subsystem 466, one or more optional optical sensors 474, one or more communication busses 412 for interconnecting the aforementioned components, and a power system 418 for powering the aforementioned components.

In some embodiments, the device is a personal computer, a table computing device, a mobile computer, a mobile phone, a smart phone, a portable computing device, a laptop, a personal digital assistant, a wearable device such as a smart watch, a touch centric device, an interactive network enabled communication device, etc.

In some embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Device 104 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 104.

It should be appreciated that device 104 is only one example of a multifunction device that may be used by end users when engaging with the channel based communication and engagement platform 200, and that device 104 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of device 100, such as CPU(s) 407 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 106. In some embodiments, circuitry 108 does not include RF circuitry and, in fact, is connected to network 106 through one or more hard wires (e.g., an optical cable, a coaxial cable, or the like).

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a user and device 104. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 104 optionally also includes one or more optical sensors 473. Optical sensor(s) 473 optionally include charge-coupled device (CCD) or complementary metal-oxide semiconductor (CMOS) phototransistors. Optical sensor(s) 473 receive light from the environment, projected through one or more lens, and converts the light to data representing an image. In conjunction with imaging module 431 (also called a camera module), optical sensor(s) 473 optionally capture still images and/or video. In some embodiments, an optical sensor is located on the back of device 104, opposite display system 408 on the front of the device, so that the touch screen is enabled for use as a viewfinder for still and/or video image acquisition. In some embodiments, another optical sensor 473 is located on the front of the device 104 so that the user's image is obtained (e.g., to verify the identity of the user, etc.).

As illustrated in FIG. 4, memory 407 of the remote user device preferably comprises:
- an operating system 473 (e.g., iOS, DARWIN, RTXC, LINUX, UNIX, OS X, WINDOWS, or an embedded operating system such as VxWorks) that includes procedures for handling various basic system services;
- a communications module 204-C for supporting bidirectional secure communication between the channel based communication and engagement platform 200, enterprise data sources 102 and remote user devices 104;
- an end user identifier 218 that uniquely identifies a user; and
- one or more primary communication channels 210 that the end user is participating in, and for each such primary channel 210, a unique enterprise data source identifier 374, enterprise data source name 376, a primary communication channel name 382, a primary communication channel description 384, an application programming interface access token 386, and an application programming interface key 388.

As such, FIGS. 1 through 4 exemplarily illustrate a business to consumer architecture of a channel based bidirectional communication and transaction system (channel based communication and engagement system "CBCES" 48) for facilitating channel based communication and engagement with consumers through advertising units. In some embodiments, the CBCES 48 is accessible by consumers, using their remote user devices 104, via an ionic framework comprising a web browser application that implements, for example, the hypertext markup language 5 (HTML5) content presentation technology, or a mobile application installed on consumer devices, for example, tablet computing devices such as the iPhone® of Apple Inc., Android devices, WINDOWS® devices of Microsoft Corporation, BLACKBERRY® devices of BlackBerry Limited, etc. Referring to FIG. 3, the CBCES 48 provides a communications module 204-E that provides a graphical communication interface comprising a public business application programming interface for enterprise data sources to communicate with users (e.g., consumers), and referring to FIG. 4, a communication module 204-C for users (e.g., consumers) to communicate with the enterprise data sources 102. The enterprise data sources 102 (e.g., business entities) publish advertising units and/or messages, for example, text messages, audio messages, video messages, images, etc., to consumers via the communications module 204-E. The users (e.g., consumers) can subscribe to offers provided by the enterprise data sources 102 (e.g, business entities) and transmit messages associated with multiple topics to the enterprise data sources 102 via the communications module 204-C.

Now that details of a CBCES 48 that provides channel based communication and engagement has been described, a flow chart of processes and features of the system, in accordance with an embodiment of the present disclosure, are disclosed with reference to FIGS. 5A through 5E. In the flow chart, optional steps or embodiments are indicated by dashed boxes.

Block 502.

One aspect of the present disclosure provides a method performed at a channel based communication and engagement platform 200. The channel based communication and engagement system comprises one or more processors and memory.

Block 504.

A search query is received from a first remote user device 104-1 associated with a first user. In order to differentiate the first user from a plurality of users, each respective user in the plurality of users comprises a unique identifier 218 for the respective user. In some embodiments the unique identifier 218 is a unique identification number assigned to the user after the user has enrolled with the channel based communication and engagement system. In some such embodiments, the user does not have access to the unique identifier 218. For instance, in some embodiments, the user chooses a login and enrolls in the channel based communication and engagement platform 200 whereupon the user is assigned the unique identifier 218 which is stored on the user device 104 associated with the user and/or in the profile associated with the user. In some instances, the unique identifier 218 is stored in an encrypted format. Then, when the user logs into the channel based communication and engagement platform 200, the unique identifier 218 is automatically sent to the channel based communication and engagement platform 200 (or retrieved from the user's profile) as part of a login in process.

Figure 6:
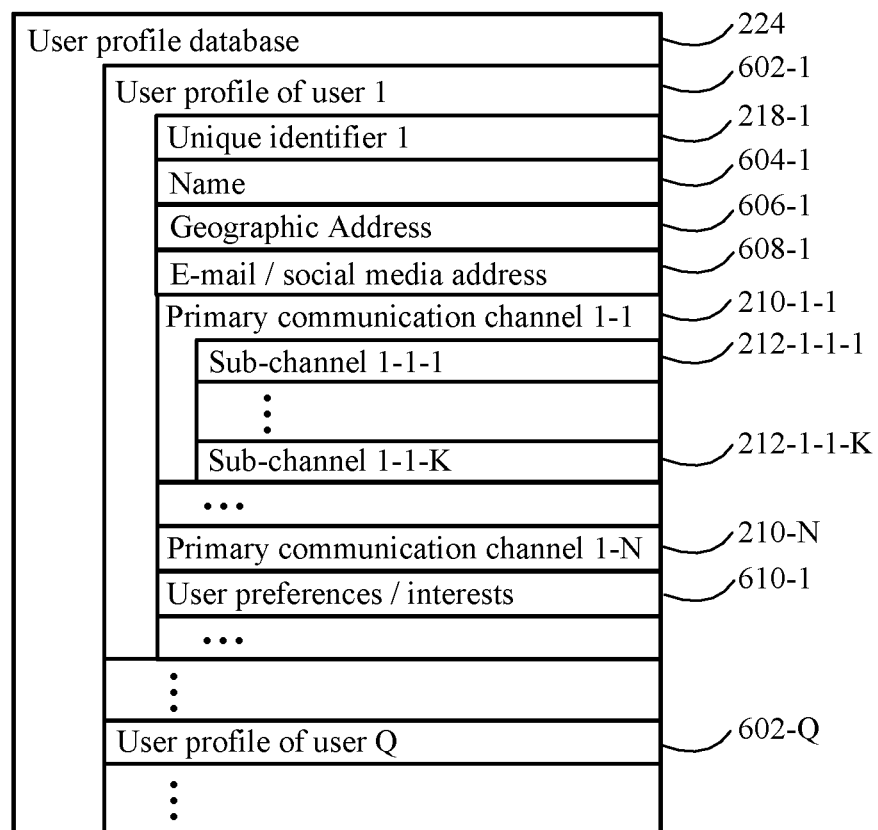
FIG. 6 illustrates an example user profile database in accordance with some embodiments of the present disclosure.
Figure 7:
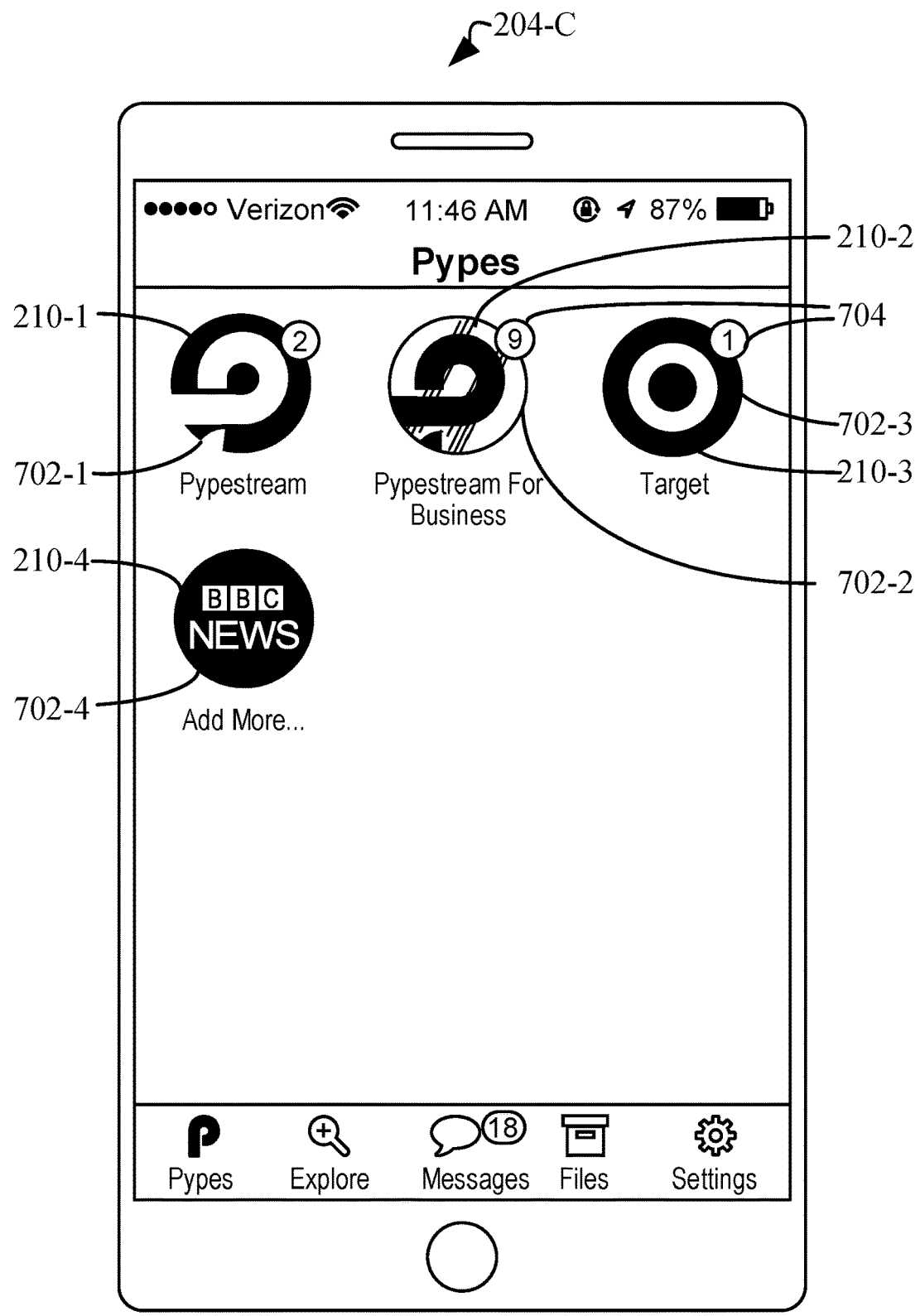
FIG. 7 provides an illustration of a graphical user interface running on a remote user device in accordance with some embodiments of the present disclosure.

In some alternative embodiments, the unique identifier is a login chosen by the user and assigned to the user once the uniqueness of the login has been verified (e.g., no other user has already chosen the login and the login is deemed to be robust enough to serve as a login). In some embodiments, for each respective user in the plurality of users, the unique identifier of the respective user is used to obtain characteristic information from a user profile corresponding to the respective user that is stored across one or more data stores. The channel based communication and engagement platform 200 retrieves characteristic information of each of the users (e.g., consumers, also referred to herein as "end users") using the unique identifier from one or more databases (e.g., user profile database 224), for example, by performing a database lookup based on the unique identifier. In some embodiments, the characteristic information comprises, for example, demographic information, consumer preferences on different subjects or topics, location information, etc., of each of the users. For instance, referring to FIG. 2, in some embodiments, user profiles are stored in user profile database 224 of channel based communication and engagement platform 200. However, in alternative embodiments the user profile is stored on the remote user device 104 (e.g., in an encrypted format). FIG. 6 provides more details of a user profile database 224 in accordance with some embodiments of the present disclosure. In the user profile database 224, a user profile 602 is stored for each user. In some embodiments, a user profile 602 for a respective user includes the unique identifier 218 of the user (e.g., a contact number of the user), the name 604 of the user, the geographic address (e.g., street address) 606 of the user, as well as one or more E-mail and/or social media addresses of the user. Further, the profile details the primary communication channels 210 to which the user has subscribed or is actively participating in. In some embodiments, the user profile of a user additionally stores the identifier of each conversation in each primary communication channel that the user is presently participating in.

Responsive to the search query, one or more channel based communication and engagement objects (CBCEO) 206 are retrieved. Channel based communication and engagement objects are software objects (e.g., data structures, variables, functions, and/or methods) that comprise primary communication channels 210. Each CBCEO 206 corresponds to a plurality of enterprise data source 102. In some embodiments, each enterprise data source includes one or more identifiers (e.g., names of the enterprise data source, contact numbers of the enterprise data source, etc.). FIG. 8 illustrates a non-limiting example of a portion of an enterprise data source description 208 that is stored in the CBCEO 206 of channel based communication and engagement platform 200 for each enterprise data source 102 in some embodiments. As illustrated in FIG. 8, the enterprise data source description 208 includes an enterprise data source identifier 374 (e.g., "business identifier") that uniquely identifies the enterprise. In some embodiments the identifier 374 is a unique number or expression associated with the corresponding enterprise data source 102. As illustrated in FIG. 8, the enterprise data source description 208 includes an enterprise data source name 376 for the enterprise data source 102. The enterprise data source name 376 is the name that is displayed to users of remote user devices 104. The enterprise data source description 208 further includes a super administrator identifier 378 for the enterprise data source 102. The super administrator is able to participate in the primary channel 210 associated with the enterprise data source 102. The enterprise data source description 208 further includes an identification of the primary communication channel administrators 380 for the enterprise data source 102. Each such primary communication channel administrator is able to participate in the primary channel 210 associated with the enterprise data source 102.

In some embodiments, the search query is by way of a search engine (e.g., the Google® search engine of Google Inc). However, the present disclosure is not limited thereto. For instance, in another embodiment the search query is directly into a web application of the channel based communication and engagement system. In some embodiments, the remote device displays an interface (e.g., a graphical user interface or a command line interface), such as an online web interface, a web based downloadable application interface, a mobile based downloadable application interface, etc., that is configured to enable the user to input a search query on the remote device.

In some embodiments, an enterprise data source 102 has access rights to each primary communication channel 210 corresponding to the enterprise data source. The enterprise data source designates access permission to the primary communication channel to one or more primary communication channel administrators 380.

Referring to block 506, in some embodiments the search query comprises one or more keywords 207 (e.g., a search query of "best digital camera" includes the keywords "digital," "camera," or a combination thereof, a search query of "blood pressure medications" includes the keywords "blood pressure," "medications," or a combination thereof). In some embodiments, a keyword 207 is associated with each CBCEO (e.g, CBCEO 206-2 is associated with the keyword "fashion"). Typically, the keyword 207 is utilized to group related enterprise data sources. For example, when a keyword is "dish-network", one or more CBCEO's corresponding to a variety of enterprise data sources 208 that provide services related to "dish-network" are retrieved. However, in some embodiments the keyword 207 is utilized to group related CBCEOs 206.

Referring to block 508, in some embodiments a keyword 207 in the one or more keywords is a target mechanism. When a keyword is a target mechanism, the keyword is configured to prevent a predetermined CBCEO 206 from being retrieved. This also prevents a predetermined primary communication channel 210 of the CBCEO from being retrieved. For instance, when a keyword "apple computer" is a target mechanism, particular CBCEOs related to apple fruits or agriculture are not retrieved. Similarly, in some embodiments the target mechanism is configured to specifically retrieved a predetermined CBCEO 206 and specific primary communication channel 210. For instance, when a keyword "dish-network" is a target mechanism, results related to DISH Network LLC are retrieved while other providers (e.g., providers utilizing coaxial cables) are not retrieved.

Referring to block 510, in some embodiments retrieving the one or more channel based communication and engagement objects 206 further comprises extracting (e.g., parsing) the one or more keywords 207 of the search query. Based on the extracted one or more keywords 207 of the search query, a channel based communication and engagement object 206 associated with each keyword in the extracted one or more keywords of the search query is retrieved. When a user of the user device 104 inputs a search query, the CBCES analyses the search query to identify and extract one or more keywords in the search query. For example, when a user of a user device 104 inputs a search query "golf courses near Pebble Beach," the CBCES identifies and extracts keywords "golf courses" and/or "Pebble Beach." Accordingly, CBCEO's related to "golf courses" and/or "Pebble Beach" are retrieved. In some embodiments, when a search query includes two or more keywords 207, the keywords are combined through various Boolean operators (e.g., AND, OR, NOT) to retrieve related CBCEOs.

Referring to block 512, in some embodiments at least one of the retrieved one or more channel based communication and engagement objects is obtained from a third-party server. In some embodiments, all of the retrieved one or more channel based communication and engagement objects are obtained from the third-party server. In some embodiments, the third-party server is an advertising server. Typically, an advertising server is configured to store one or more advertising units and/or one or more CBCEOs 206.

Block 514.

Each respective channel based communication and engagement object 206 in the one or more channel based communication and engagement objects comprises a primary communication channel 210 of a corresponding enterprise data source 102 in a plurality of enterprise data sources. Each respective primary communication channel corresponding to a respective enterprise data source in the plurality of enterprise data sources is configured to facilitate electronic communication between the respective enterprise data source and a different plurality of users. In typical embodiments, these primary communication channels 210 pre-exist with other users connected to them. However, in some embodiments the primary communication channel is instanced upon retrieval of the associated CBCEO. Each primary communication channel 210 enables one-to-one communication between a corresponding enterprise data source 102 in a plurality of enterprise data sources and a respective user in the plurality of users and facilitates electronic communication between the single corresponding enterprise data source 102 and the single respective user.

In typical embodiments, messages are typically communicated between the enterprise data source 102 and the remote user devices 104 on the primary communication channel 210. Each primary communication channel 210 comprises a variety of messages between a plurality of users and the enterprise data source 102. As previously described, in order to determine a destination and/or origin for each message, a user identifier 218 is associated with each message. Thus, by way of the user identifier 218, only the messages with the user identifier 218 of a corresponding user 216 can be communication to and from the user 216.

Referring to block 516, in some embodiments the retrieving the one or more channel based communication and engagement objects 206 comprises generating a list, or catalog, of enterprise data sources 102. The list comprises each enterprise data source 102 and corresponding primary communication channel 210 of the enterprise data sources in the plurality of enterprise data sources associated with the retrieved channel based communication and engagement objects 206. In some embodiments, the channel based communication and engagement objects 206 are selected without human intervention from the list responsive to the search query. For instance, when the list is compiled a determination is made as to the most relevant CBCEOs 206 contained in the list, and these relevant CBCEO's are automatically selected by the CBCES.

Referring to block 518, in some embodiments the channel based communication and engagement system is associated with a plurality of keywords 207 of the enterprise data source 102. For example, in some embodiments the CBCES is associated with keywords "JAVA" and "Script" so that only enterprise data sources 102 related to JAVA Script are retrieved while enterprise data sources related to coffee products are not retrieved. Associating enterprise data sources 102 and CBCEOs 206 with keywords simplifies the retrieval and selection processes of the present disclosure.

Block 520.

Upon retrieval of the one or more CBCEO 206, the one or more CBCEO are integrated into an advertising unit of a data source. As previously described, data sources are networked locations that maintain a collection or compilation of one or more webpages. Advertising units are graphical advertising elements configured in a variety of advertising formats. Typically, a webpage has an advertising unit that is configured to manage one or more advertisements for the webpage. Advertisements include but are not limited to static images, GIFs, video(s), audio, text, etc. For instance, an advertising unit of a webpage typically comprises locations, resolutions, aspect ratios, sizes, types of advertisements, number of advertisements on the webpage, as well as formats of the advertisements (e.g., a mobile format, an online format, an offline format, etc.) Integrating the CBCEOs into an advertising unit allows the primary communication channels of the CBCEOs to be distributed broadly across a variety of platforms and networks.

Referring to block 522, in some embodiments the advertising unit is a standard interactive advertising bureau advertising unit. The standard interactive advertising bureau advertising unit has defined parameters are types (e.g., the ad unit can be either HTML 5, JPEG, PNG, or GIF file types) that creates uniform ad units across a variety of platforms and devices. Typically, the standard interactive advertising bureau advertising unit for the United States is one column, which is 2 and $\frac{1}{16}^{th}$ inches, wide, one inch deep, and $\frac{1}{8}^{th}$ inch gutter between columns. Accordingly, in some embodiments, the advertising unit is a standardized form of another bureau, organization, or region (e.g., a European or Asian standard).

Block 524.

The advertising unit, which comprises the integrated CBCEO 206, is rendered on a display page. A display page refers to a webpage that is in communication to the World Wide Web. A common display page format includes but is not limited to HTML. In some embodiments, the display page is a webpage rendered by the data source to a browser of the user device 104. Accordingly, the rendered advertising unit is displayed to the user device 104.

Block 526.

A selection of a first enterprise data source in the plurality of enterprise data sources is received. This selection is through the one or more channel based communication and engagement objects 206 of the rendered advertising unit from the user device 104. For instance, in some embodiments, the user clicks on or touches the rendered advertising unit to select it. In some embodiments, the selection is by way of a universal resource locator (URL) associated with the first enterprise data source. Similarly, in other embodiments the selection is by way of an embedded link in the advertising unit.

Referring to block 528, in some embodiments the first enterprise data source is a store, a chain of stores, a government institution or service, a company, a corporation, an enterprise, an advertising firm, a restaurant, a healthcare organization, an organization, or a social organization. However, the present disclosure is not limited thereto.

Block 530.

A first secure bidirectional conversation is established in response to the selection of the first enterprise data source 102. This secure bidirectional conversation comprises an exchange of a first plurality of messages between the first remote user device 104-1 and the first enterprise data source 102. As previously described, these messages are communicated through a first primary communication channel 210 of the first enterprise data source.

Referring to block 532, in some embodiments the first plurality of messages in the first secure bidirectional conversation is between the first remote user device 104-1 and the first enterprise data source 102 associated with the first primary communication channel 210. These messages comprise a first message that is posted by the first enterprise data source 102. The first message is associated with a first application programming interface (API) token which identifies a first user associated with the first remote user device 104-1.

Figure 9:
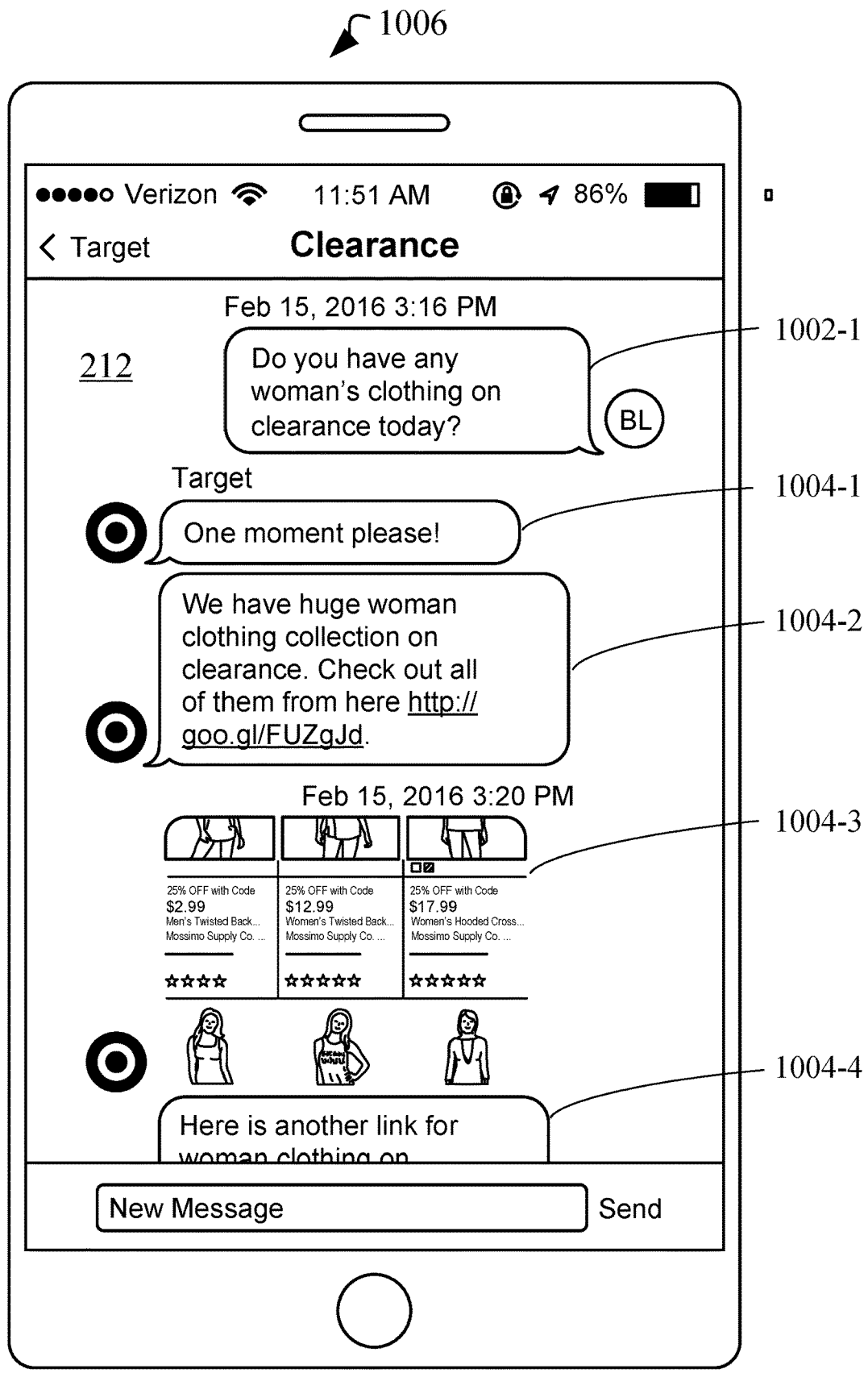
FIG. 9 illustrates the secure bidirectional communication that occurs on one such primary channel in accordance with an embodiment of the present disclosure.
Figure 10:
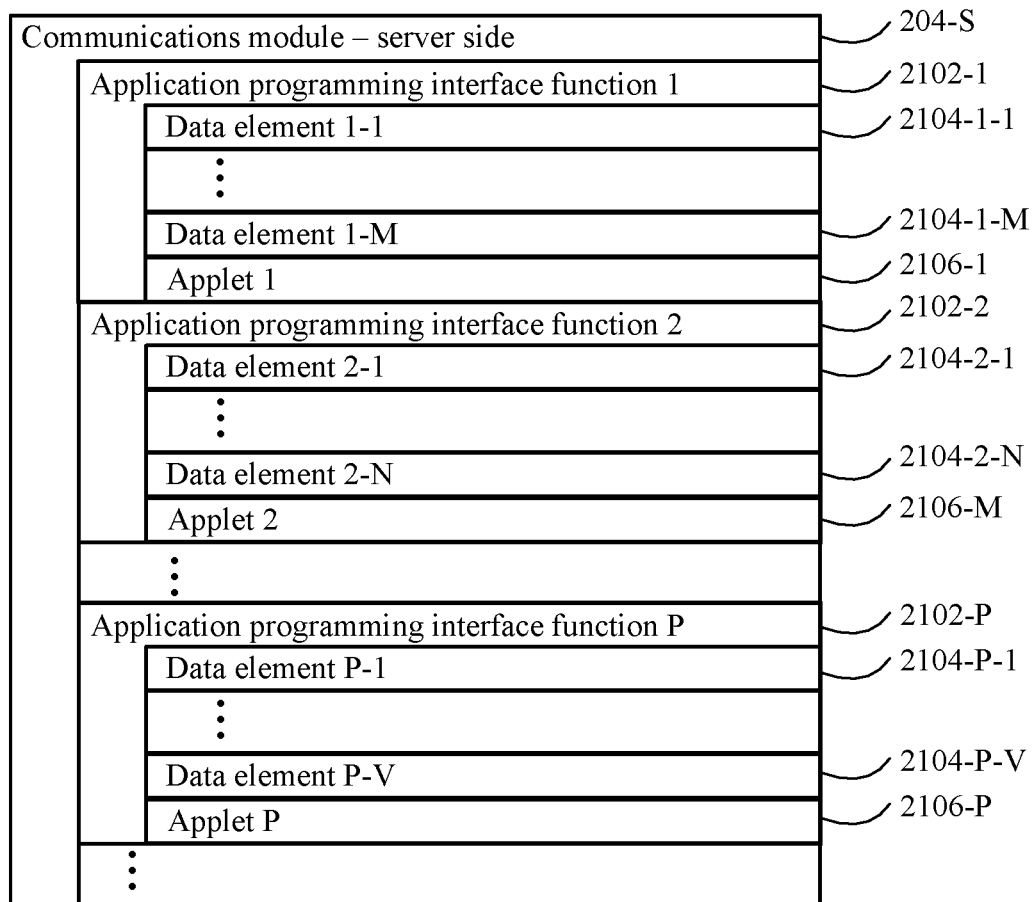
FIG. 10 illustrates several different application programming interface functions provided by an instance of a communications module running on a channel based communication and engagement system where each such respective function has a number of data elements that serve as input to the function in accordance with an embodiment of the present disclosure.

FIG. 9 illustrates the secure bidirectional communication that occurs on one such primary communication channel 210 in the form of a conversation. Message 1002 originates from the user associated with a particular remote user device 104.

This message is communicated in the primary communication channel 210 to the corresponding enterprise data source 102. The enterprise data source 102 responds to message 1002 with messages 1004, which are routed only to the particular remote user device 104 that originated message 1002. That is, messages in the primary communication channel illustrated in FIG. 9 are limited to the particular associated remote user device 104 and the particular enterprise data source 102 associated with the primary communication channel. As previously describe, the primary communication channel comprises messages of other user devices (e.g., user device 104-3); however, users are only able to receive messages linked to their specific user identifier 218.

As illustrated in FIG. 9, the communications module 204-C operating on remote user device 104 renders a graphical communications interface 1006, for example, in an electronic mail (email) layout on the remote user device 104 for enabling bidirectional communication of messages and content between the user and the enterprise data source 102 in real time through a primary communication channel 210. The content comprises, for example, one or more of messages (e.g., messages 1002-1, 1004-1, 1004-2, and 1004-4 of FIG. 9) image content (e.g., image 1004-3 of FIG. 9), audio content, video content, audiovisual content, multimedia content, animations, digital content, email content, voicemail content, document content, files, etc., and any combination thereof. As illustrated in FIG. 9, the graphical communications interface 1006 combines a peer to peer chat application with an email layout on the consumer device to create the graphical communication interface. In some embodiments, the channel based communication and engagement platform 200 encodes each of the messages and the content using strong encryption technologies, for example, public-key cryptography with a private key such as a personal identification number (PIN) and a two-factor authentication, and facilitates a secure transmission and a secure reception of the messages and the content through the primary communication channel 210 via the rendered graphical communication interface 1006. As used herein, "public-key cryptography" refers to a class of cryptographic algorithms that requires a private key and a public key. Also, as used herein, "two-factor authentication" refers to an unambiguous identification of a user using a combination of two different components which a user knows or possesses. In an embodiment, the channel based communication and engagement platform 200 securely stores the encoded messages and the encoded content in one or more databases and/or in the user devices. The channel based communication and engagement platform 200 uses different types of encoding methods for secure storage and secure transmission of the messages and the content. In an embodiment, the channel based communication and engagement platform 200 offers different levels of security based on a user's security needs. For example, the channel based communication and engagement platform 200 provides a RSA® hardware certificate, a RSA SECURID® of the EMC corporation, or a one-time key or token to consumers who require a high level of security. In an embodiment, the channel based communication and engagement platform 200 receives and sends requests for establishing primary communication channels 210 between enterprise data sources 102 and users via the communications module 204-C of FIG. 4.

Referring to block 534, in some embodiments the first primary communication channel further hosts a second plurality of messages. These second messages are communicated in another (i.e., second) secure bidirectional conversation which is different than the first secure bidirectional conversation. The second conversation is between a second remote user device 104-2 associated with a second user and the first enterprise data source 102-1. The second plurality of messages comprises a second message posted by the first enterprise data source 102-1. The second message is associated with a second application programming interface token which identifies the second user associated with the second remote user device. The first application programming interface token is used to route the first message to the first remote user device within the first primary communication channel. The second application programming interface token is used to route the second message to the second remote user device within the first primary communication channel. Thus, messages communicated through each primary communication channel are received only by their intended recipient(s).

As previously described, in typical embodiments an enterprise data source 102 uses the same primary communication channel 210 to communicate with multiple users. While the enterprise data source 102 can review messages sent by each of these users, each respective user cannot see messages sent by the enterprise data source 102 to other users nor can they see messages originated by other users. Accordingly, in some embodiments a respective primary communication channel 210 in the plurality of primary communication channels comprises (e.g., hosts) a first secure bidirectional conversation between a first remote user device 104 associated with the first user and the enterprise data source 102 associated with the primary communication channel. This facilitates secure exchange of the first plurality of messages. Moreover, the first primary communication channel 210 comprises (e.g., hosts) a second secure bidirectional conversation between a second remote user device 104-2 associated with a second user and the enterprise data source associated with the primary communication channel, thereby facilitating secure exchange of a second plurality of messages. The first user cannot see any of the messages in the second plurality of messages. The second user cannot see any of the messages in the first plurality of messages. The enterprise data source 102 can see all the messages in the first plurality of messages and the second plurality of messages.

In some embodiments, this above-described one-to-one aspect of the communication between a given enterprise data source 102 and respective users is imposed using application program interface ("API") keys and tokens, where the API key identifies a particular enterprise data source resource 102, such as a particular primary communication channel 210 belonging to a particular enterprise data source resource 102 and the API token indicates the identity of source message or content. In some such embodiments, the API token not only serves to identify the originator of the content, it also serves to designate what access privileges the originator of the content or message have over the primary communication channel 210. In some embodiments, the post request will further include a chatroom identifier (e.g., conversation identifier) and/or chatroom consumer identifier (e.g., conversation user identifier). In typical embodiments, only one user will have access to such a chatroom (conversation), thereby establishing the one-to-one communication between an enterprise data source 102 and an end user.

In another illustrative embodiment, a first message in a first plurality of messages is posted by the enterprise data source 102, where the first message is associated with an application programming interface key identifying the primary communication channel 210-1 of the enterprise data source 102 and a first application programming interface token identifying the first user. Further, a second message in the second plurality of messages is posted by the enterprise data source 102. The second message is associated with the application programming interface key identifying the primary communication channel 102-1 of the enterprise data source 102 and a second application programming interface token identifying a second user associated with a second remote user device 104-2. In this example, the first application programming interface token and the application programming interface key are used to route the first message to the first remote user device 104-1 within the primary communication channel 210-1. The second application programming interface token and the application programming interface key are used to route the second message to the second remote user device 104-2 within the primary communication channel. Thus, the first message is in a first conversation hosted by the primary communication channel and the second message is in a second conversation hosted by the primary communication channel.

In some embodiments, messages posted on primary communication channels are encrypted at the originating device (e.g., remote user device 104 or enterprise data source 102) using private information. For instance, if the message is posted by the end user, private information associated with the end user, or the end user's remote device, is used to encrypt the message. If the message is posted by the enterprise data source, private information associated with the enterprise data source is used to encrypt the message.

Thus, in typical embodiments, the channel based communication and engagement platform 200 provides complete transaction support inside a primary communication channel 210. Using the channel based communication and engagement platform 200, enterprise data sources 102 (e.g., business entities) can establish one or more primary communication channels 210 with their users (e.g., consumers), after which messages covering different subjects and topics and offering transaction services can be established. Within each primary communication channel, a user, participating in a private (secure) conversation with the enterprise data source can reply to a transaction message, for example, an electronic commerce (e-commerce) offer message by purchasing the ecommerce offer as disclosed in the examples below. The channel based communication and engagement platform 200 implements e-commerce using one or more payment infrastructures, for example, STRIPE® of Stripe, Inc., PAYPAL® of PayPal, Inc., etc.

Referring to block 536, in some embodiments an automated human interface module is used to parse a reply from the first user to the first message. When the automated human interface module is unable to find a matching response to the reply from the first user, the automated human interface module refers the first user to a human operator or another automated human interface module. The human operator is associated with the first primary communication channel. When the automated human interface module is able to find a matching response to the reply from the first user, the automated human interface module provides the matching response to the first user by providing the matching response along with the first application programming interface token identifying the first user associated with the first remote user device.

For example, a first primary communication 210 channel in a plurality of primary communication channels hosts a first conversation between the enterprise data source 102 corresponding to the first primary communication 210 and a first user. The first conversation has a first human intervention status. When the first human intervention status is deemed automated, messages in the first conversation from the remote user device 104 associated with the first user are processed by a first automated human interface module. When the first human intervention status is deemed non-automated, messages in the first conversation from the remote user device 104 associated with the first user are placed in a queue for processing by a human associated with the corresponding enterprise data source 102 of the first primary communication channel 210.

In some embodiments, a user input specifically triggers the change from automated to non-automated. For example, the user might say "I want to talk with an operator", and that might result in reclassifying further messages in the conversation such that they are routed to a non-automated agent (e.g., human call center rep). This routing could in principle change back and forth many times during a conversation, between an automated agent (the first human intervention status of the conversation is deemed automated) and a non-automated (human) agent (the first human intervention status of the conversation is deemed non-automated).

As noted above, several conversations may concurrently be held on a primary communication channel, of which only one is with a particular end user. The status of each of these conversations may be different. For instance, consider the case where there are seven conversations concurrently being held on a given primary communication channel. In this example, four of the conversations may be deemed automated and serviced by an automated human interface module whereas the remaining three may be deemed non-automated and serviced by a human operator.

In some embodiments, a trained classifier is used to monitor conversations on a primary communication channel 210 for the purpose of changing the status of such conversations from automated to non-automated. For instance, such a trained classifier may parse the messages posted by users for certain keywords 207 such as "operator" or other words or events that have been determined to be associated with a need for human intervention. For instance, the user may have looped through several different nodes of an automated human interface module and may be getting frustrated. Advantageously, in some embodiments, classifiers are trained based on the broad aggregate of user interactions from a plurality of users over time.

Figure 11:
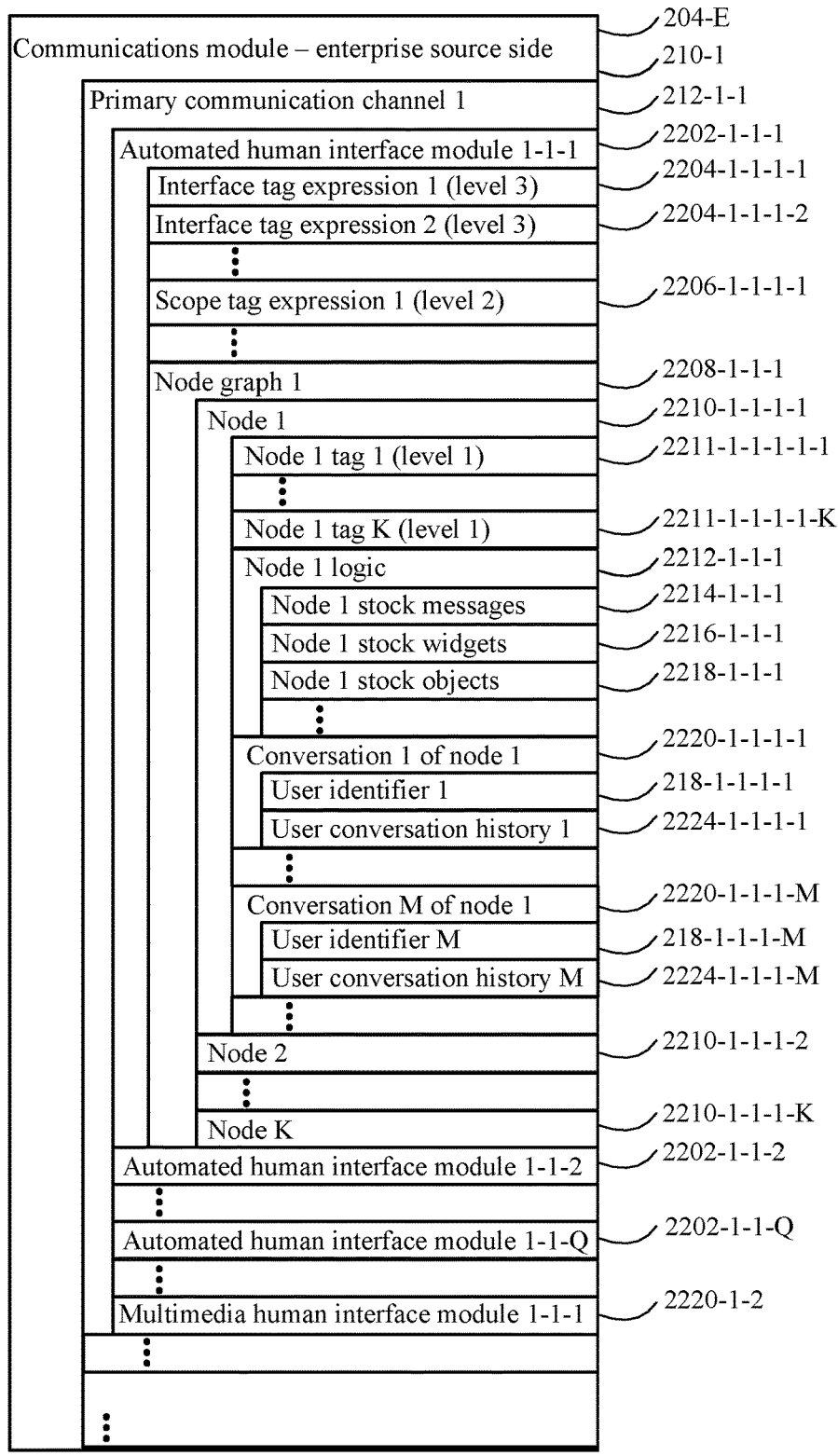
FIG. 11 illustrates a plurality of automated human interface modules ("automated messaging bots") in accordance with an embodiment of the present disclosure.
Figure 12:
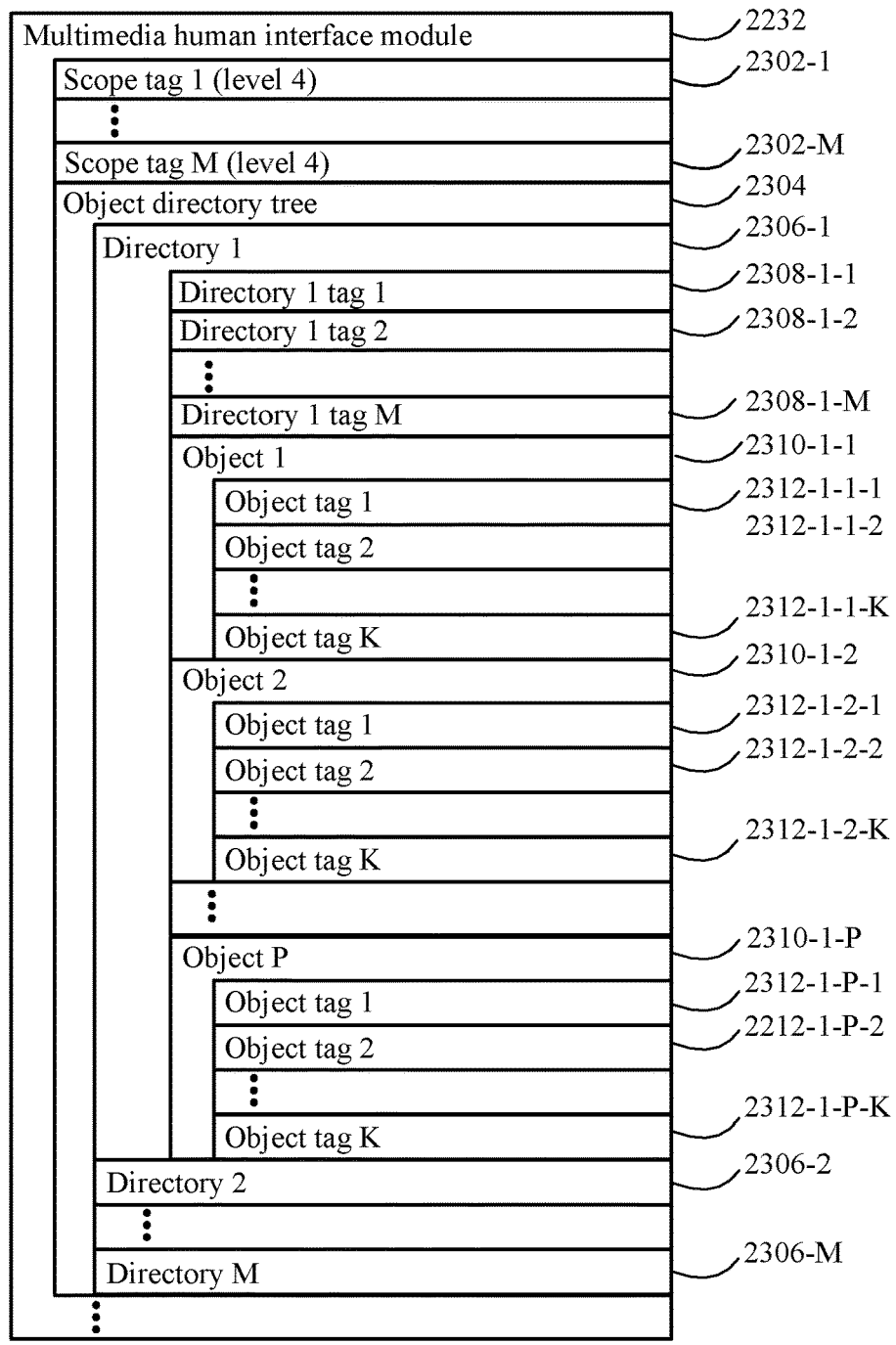
FIG. 12 illustrates a multimedia human interface module in accordance with an embodiment of the present disclosure.

Referring to FIG. 11, the disclosed channel based communication and engagement platform 200 provides a plurality of automated human interface modules ("automated messaging bots") 2202 and a system for managing and deploying these automated messaging bots. Each automated messaging bot reflects a defined message and/or transaction capability. Automated messaging bots can contain a range of content and functionality, from a simple static response, to sophisticated knowledge systems that can power automated conversations leading to solutions and integrated transactions with external systems; e.g., payments, reservations, etc. The channel based communication and engagement platform 200 supports the generation of custom, native, intelligent automated messaging bots 2202, selection of automated messaging bots from third party platforms, and defining flexible integrations of these automated messaging bots into automated messaging response networks.

Each automated messaging bot 2202 provides a certain scope and capability for automatically engaging end users in a conversational flow. Functional transactions can also be integrated into conversational exchange. The goal is for each automated messaging bot 2202 to help end users typically either resolve a question/problem or to fulfill a specific transaction, all via the disclosed messaging communications framework. An end user's conversation 2220 with an automated messaging bot is initiated when the initial message from the end user associated with a remote user device 104 is assigned to the automated messaging bot 2202. The automated messaging bot 2202 will initiate a response to the initial message based on its available logic. The end user's selection of available predefined responses or a typed message response are the triggers the bot 2202 uses to navigate the end user through it's available content logic (node graph 2208). If an automated messaging bot's exit criteria/conditions are met, the conversation either ends or is moved out of the bot 2202 and is either reassessed by the system, moved to a live support message queue 2228, or reassigned to another automated messaging bot 2202 (e.g., one that has a different logic flow and thus will provide a complementary orthogonal end user experience).

Some embodiments of the disclosed systems and methods provide the ability to create, manage and administer bots 2202 to make them available for use in creating, editing, or deleting bots 2202 via a primary communication channel user interface, by either using a user interface based automated message flow builder or by uploading VXML, or properly formatted JSON files.

Some embodiments of the disclosed systems and methods provide a user interface based bot 2202 designer to assist in the creation and editing of the automated message flows within bots 2202. Referring to FIG. 11, in some embodiments this automated message flow is manifested as a node graph 2208. The bot 2208 designer includes the ability to define the name of the automated message bot, create, edit, and delete individual nodes 2210 in the bot 2202, the ability to expand/collapse node 2210 branches, the ability to see and edit the message content for a node 2210 (e.g., stock messages 2214, stock widgets 2216, stock multimedia objects 228), and the ability to see node traversals (e.g., when one or more nodes 2210 connect to a different node).

In some embodiments, a node 2210 of a bot 2202 reflects a predetermined decision point within the bot. The bot tries to evaluate an incoming message from a remote user device 104 by parsing the incoming for recognized keywords and phrases. Based on detection of such keywords, the automated human interface module 2202 will progress the end user in a particular direction within the node graph 2208. Thus, the use of nodes 2210 within a bot 2202 is similar to walking through a decision tree, with different nodes 2210 in the bot 2202, where the bot knows the position of an end user in the decision tree and can progress the end user in the node graph 2208. However, the analogy to the decision tree here is merely exemplary. More generally, nodes 2210 in the node graph 2208 embody a logic that can evaluate messages, and based on this evaluation, take some action such as send a message to the end user and/or send the conversation 2220 associated with the end user to another node in the node graph 2208 of the bot 2202, the node graph 2208 of another bot 2208, or to the queue 2228 of a live operator depending on the end user message, the choices made by the end user, the user conversation history 2224, etc.

In some embodiments, the automated human interface module 2202 designer further includes the ability to add, edit, and delete the end user's response options (e.g., option buttons provided in a widget 2216) per node 2210. Such response options, include, but are not limited to, an ability to define a specific destination node 2208 for each end user option, an ability to define a node option to close a chat session (e.g., by user selecting the session closing "problem is resolved" option, and in some embodiments with the system able to send a final response within the conversation such as "Happy to help, have a great day"), connecting to a different bot 2202, ability to move the end user to a different automated human interface module 2202 ability to select a specific destination node 2210 within the node graph 2208 of the bot 2202, ability to have the bot 2202 send multiple separate messages to the end user in the conversation 2220 in sequence, for instance one right after the other (near instantaneous), ability to add, change or delete an embedded third party widget 2216 (e.g., payment transaction) for a node 2210, ability to add, change or delete a predefined system widget 2216 (e.g.: list picker for a list of service or production options, date picker, etc., a visual indicator for whether a node 2210 has any node tags 2211 associated with it. A tag is a single keyword or phrase and can be assigned by the enterprise data source 102.

Tags reflect a single keyword or phrase and can be assigned to specific nodes 2210 within a node graph 2208 of an automated human interface module 2202 and for the overall scope of the automated human interface module 2202 when an end user's conversation 2220 has been entered into the automated human interface module's 2202 automated message flow (node graph 2208).

In some embodiments, the automated human interface module 2202 administrator interface based bot 2202 designer provides the ability to add, edit, and delete one or more node level tags 2210, the ability to add, edit, and delete one or more human interface module tags 2204 and scope tags 2206, and the ability to add a multimedia human interface module 2232 to one or more nodes 2210 in a node graph 2208 of an automated human interface module 2202. As illustrated in FIG. 11, each node tag 2211 is required to point to a specific node 2210 in the node graph 2208 of an automated human interface module 2202. However, as further illustrated in FIG. 11, node tags 2211 can be grouped, that is multiple node tags can all point to the same node in the node graph 2208 of an automated human interface module 2202.

Referring to FIG. 11, the disclosed channel based communication and engagement platform 200 provides a plurality of automated human interface modules ("automated messaging bots") 2202 and a system for managing and deploying these automated messaging bots. Each automated messaging bots reflects a defined message and/or transaction capability. Automated messaging bots can contain a range of content and functionality, from a simple static response, to sophisticated knowledge systems that can power automated conversations leading to solutions and integrated transactions with external systems; e.g. payments, reservations, etc. The channel based communication and engagement platform 200 supports the generation of custom, native, intelligent automated messaging bots 2202, selection of automated messaging bots from third party platforms, and defining flexible integrations of these automated messaging bots into automated messaging response networks.

Each automated messaging bot 2202 provides a certain scope and capability for automatically engaging end users in a conversational flow. Functional transactions can also be integrated into conversational exchange. The goal is for each automated messaging bot 2202 to help end users typically either resolve a question/problem or to fulfill a specific transaction, all via the disclosed messaging communications framework. An end user's conversation 2220 with an automated messaging bots is initiated when the initial message from the end user associated with a remote user device 104 is assigned to the automated messaging bot 2202. The automated messaging bot 2202 will initiate a response to the initial message based on its available logic. The end user's selection of available predefined responses or a typed message response are the triggers the bot 2202 uses to navigate the end user through it's available content logic (node graph 2208). If an automated messaging bot's exit criteria/conditions are met, the conversation either ends or is moved out of the bot 2202 and is either reassessed by the system, moved to a live support message queue, or reassigned to another automated messaging bot 2202 (e.g., one that has a different logic flow and thus will provide a complementary orthogonal end user experience).

Some embodiments of the disclosed systems and methods provide the ability to create, manage and administer bots 2202 to make them available for use in creating, editing, or deleting bots 2202 via a primary communication channel user interface, by either using a user interface based automated message flow builder or by uploading VXML, or properly formatted JSON files.

Some embodiments of the disclosed systems and methods provide a user interface based bot 2202 designer to assist in the creation and editing of the automated message flows within bots 2202. Referring to FIG. 11, in some embodiments this automated message flow is manifested as a node graph 2208. The bot 2208 designer includes the ability to define the name of the automated message bot, create, edit, and delete individual nodes 2210 in the bot 2202, the ability to expand/collapse node 2210 branches, the ability to see and edit the message content for a node 2210 (e.g., stock messages, stock widgets, stock multimedia objects), and the ability to see node traversals (e.g., when one or more nodes 2210 connect to a different node).

In some embodiments, a node 2210 of a bot 2202 reflects a predetermined decision point within the bot. The bot tries to evaluate an incoming message from a remote user device 104 by parsing the incoming for recognized keywords and phrases. Based on detection of such keywords, the automated human interface module 2202 will progress the end user in a particular direction within the node graph 2208. Thus, the use of nodes 2210 within a bot 2202 is similar to walking through a decision tree, with different nodes 2210 in the bot 2202, where the bot knows the position of an end user in the decision tree and can progress the end user in the node graph 2208. However, the analogy to the decision tree here is merely exemplary. More generally, nodes 2210 in the node graph 2208 embody a logic that can evaluate messages, and based on this evaluation, take some action such as send a message to the end user and/or send the conversation 2220 associated with the end user to another node in the node graph 2208 of the bot 2202, the node graph 2208 of another bot 2208, or to the queue of a live operator depending on the end user message, the choices made by the end user, the user conversation history 2224, etc.

In some embodiments, the automated human interface module 2202 designer further includes the ability to add, edit, and delete the end user's response options (e.g., option buttons provided in a widget) per node 2210. Such response options, include, but are not limited to, an ability to define a specific destination node 2208 for each end user option, an ability to define a node option to close a chat session (e.g., by user selecting the session closing "problem is resolved" option, and in some embodiments with the system able to send a final response within the conversation such as "Happy to help, have a great day"), connecting to a different bot 2202, ability to move the end user to a different automated human interface module 2202 ability to select a specific destination node 2210 within the node graph 2208 of the bot 2202, ability to have the bot 2202 send multiple separate messages to the end user in the conversation 2220 in sequence, for instance one right after the other (near instantaneous), ability to add, change or delete an embedded third party widget 2216 (e.g., payment transaction) for a node 2210, ability to add, change or delete a predefined system widget 2216 (e.g.: list picker for a list of service or production options, date picker, etc., a visual indicator for whether a node 2210 has any node tags 2211 associated with it. A tag is a single keyword or phrase and can be assigned by the enterprise data source 102.

Tags reflect a single keyword or phrase and can be assigned to specific nodes 2210 within a node graph 2208 of an automated human interface module 2202 and for the overall scope of the automated human interface module 2202 when an end user's conversation 2220 has been entered into the automated human interface module's 2202 automated message flow (node graph 2208).

In some embodiments, the automated human interface module 2202 administrator interface based bot 2202 designer provides the ability to add, edit, and delete one or more node level tags 2210, the ability to add, edit, and delete one or more human interface module tags 2204 and scope tags 2206, and the ability to add a multimedia human interface module 2232 to one or more nodes 2210 in a node graph 2208 of an automated human interface module 2202. As illustrated in FIG. 11, each node tag 2211 is required to point to a specific node 2210 in the node graph 2208 of an automated human interface module 2202. However, as further illustrated in FIG. 11, node tags 2211 can be grouped, that is multiple node tags can all point to the same node in the node graph 2208 of an automated human interface module 2202.

Block 536 provides just one example of the use of API keys and tokens. In some embodiments of the present disclosure, API keys designate a number of operation available in the channel based communication and engagement platform 200, including but not limited to, defining an enterprise data source 102 within the channel based communication and engagement platform 200, defining each primary communication channel 210 associated with the enterprise data source 102, connecting a user to a primary communication channel 210, and so forth.

Referring to block 538, in some embodiments a location of a second remote user device associated with a second user within the first primary communication channel is received. A determination is made whether the location is within a geographical zone in a plurality of geographical zones. When the location is within a geographical zone in the geographical plurality of zones, information is communicated from the first enterprise data source 102-1 to the remote user device associated with the second user 104-2 within the first primary communication channel based 210, at least in part, on the location. When the location is not within a geographical zone in the geographical plurality of zones no information is communicated from the first enterprise data source to the remote user device associated with the second user within the first primary communication channel.

Advantageously, the channel based communication and engagement platform 200 support geographic dependent messages. For instance, in some embodiments a location of a remote user device 104 associated with a first user within a first primary communication channel 210 is received. A determination is made as to whether the location is within a geographical zone (e.g., country, region/state, city, town, county, metro code/zip code) in a plurality of geographical zones. When the location is within a geographical zone in the geographical plurality of zones, information from the enterprise data source 102 is communicated to the remote user device 104 associated with the first user within the first primary communication channel 210 based, at least in part, on the location. When the location is not within a geographical zone in the geographical plurality of zones, no information from the enterprise data source 102 is communicated to the remote user device 104 associated with the first user within the first primary communication channel.

To illustrate, an enterprise data source 102 (e.g., business entity), for example, MORANDI® restaurant of Morandi LLC., offers a special offer, for example, a temporal offer from Mar. 2, 2015 through Mar. 5, 2015, to users subscribing to the "ZAGATS.NYC.bestItalian.*" primary communication channel 210 through an advertising unit. In an embodiment, the channel based communication and engagement platform 200 implements a periodic geolocation mechanism to transmit location sensitive messages comprising advertising units to users through the first primary communication channel. As used herein, "periodic geolocation mechanism" refers to a method of determining a geolocation of a user (e.g., consumer) and delivering different content to the user based on the user's location parameters comprising, for example, country, region/state, city, metro code/zip code, organization, internet protocol (IP) address, an internet service provider (ISP), etc. The channel based communication and engagement platform 200 triggers a push notification if the user, due to the periodic geolocation obtained from the remote user device 104 associated with the user, heartbeats with a channel based communication and engagement platform 200 presence service when proximal to the MORANDI® restaurant. For example, if the user is within a two-mile radius of the MORANDI® restaurant, then the channel based communication and engagement platform 200 sends the user a message about an advertising unit comprising a 25% discount on a billing transaction for a dinner for two, provided the billing transaction is greater than $150, through the primary communication channel 210. In an embodiment, a consumer agent on a server or a cloud computer handles the push notification, for example, by performing a k-cluster nearest neighbor calculation to determine a match with a standard deviation of 1 mile. As used herein, "k-cluster nearest neighbor calculation" refers to a pattern recognition calculation performed for statistical classification and regression analysis. The geolocation heartbeat can be expressed on a Google® Map of Google, Inc., to show pulse rate and movement of the user in a particular location. In an embodiment, the channel based communication and engagement platform 200 supports the delivery of a message based on time scheduling with users being deemed active or relevant, if they meet demographic criteria and are in a particular geographical location defined, for example, by a longitudinal and latitudinal address, and therefore sends a message and/or an advertising unit to those users in real time through their respective primary communication channel 210.

Referring to blocks 540 and 542, in some embodiments the first primary communication channel hosts five or more conversations. In some embodiments, the first primary communication channel hosts ten or more conversations. In some embodiments, the first primary communication channel hosts fifty or more conversations. In some embodiments, the first primary communication channel hosts a hundred or more conversations. In some embodiments, the first primary communication channel hosts a thousand or more conversations. As noted above, each conversation is between the first enterprise data source and a different user in the plurality of users associated with the first primary communication channel.

Referring to block 544, in some embodiments the first primary communication channel 210 facilitates electronic payment processing, customer sign-up, marketing messages or campaigns, or customer service.

Block 546 through 550.

In some embodiments, a communication (e.g., conversation or CBCEO) is further established between the remote user device 104 and a representative of the selected enterprise data source. In some embodiments, the communication is established through a channel based communication and engagement object 206 of the selected enterprise data source 102 upon conclusion of the established bidirectional communication between the remote user device and the selected enterprise data source. In some embodiments, the communication is established in response to a user request. In some embodiments, the representative of the selected enterprise data source is a call center agent, a customer support representative, or an intelligent automation chat-bot such as the previously described automated human interface module.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a non-transitory computer readable storage medium. For instance, the computer program product could contain the program modules shown in any combination of FIG. 1, 2, 3, or 4. These program modules can be stored on a CD-ROM, DVD, magnetic disk storage product, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A channel based communication and engagement system comprising one or more processors and a memory, the memory comprising non-transitory instructions configured to perform a method, the method comprising:
  (A) responsive to a search query received from a first remote user device associated with a first user, retrieving a channel based communication and engagement object comprising a communication channel of an enterprise data source that facilitates electronic communication between the enterprise data source and a plurality of users, (B) integrating the retrieved channel based communication and engagement object into an advertising unit of a data source;

(C) rendering the advertising unit comprising the integrated channel based communication and engagement object on a display page rendered by the data source to a display of the first remote user device; and (D) responsive to a selection of the advertising unit by a first user, in the plurality of users, wherein the first user is associated with the first remote user device, establishing a first secure bidirectional conversation comprising an exchange of one or more messages between the first remote user device and the enterprise data source through the communication channel of the enterprise data source, wherein the one or more messages in the first secure bidirectional conversation between (i) the first remote user device and (ii) the enterprise data source associated with the communication channel comprises:

a first message posted by the enterprise data source, wherein the first message is associated with a first application programming interface token identifying the first user.

2. The method of claim 1, wherein the search query comprises one or more keywords.

3. The method of claim 2, wherein the retrieving the channel based communication and engagement object further comprises:

extracting the one or more keywords of the search query; and retrieving, based on the extracted one or more keywords of the search query, a channel based communication and engagement object associated with each keyword in the extracted one or more keywords of the search query.

4. The method of claim 2, wherein a keyword in the one or more keywords is a target mechanism configured to prevent a predetermined channel based communication engagement object comprising a predetermined communication channel from being retrieved.

5. The method of claim 1, wherein the retrieving the channel based communication and engagement object comprises generating a list of one or more enterprise data sources, wherein the list comprises each enterprise data source and corresponding communication channel in a plurality of enterprise data sources associated with the retrieved channel based communication and engagement object, and wherein the channel based communication and engagement object is selected without human intervention from the list responsive to the search query.

6. The method of claim 1, wherein the retrieved channel based communication and engagement object is obtained from a third-party server.

7. The method of claim 1, wherein the channel based communication and engagement system is associated with a plurality of keywords of the enterprise data source.

8. The method of claim 1, wherein the advertising unit is a standard interactive advertising bureau advertising unit.

9. The method of claim 1, wherein a communication is further established between the remote user device and a representative of the enterprise data source.

10. The method of claim 9, wherein the representative of the selected enterprise data source is a call center agent or an intelligent automation chat-bot.

11. The method of claim 9, wherein the communication is established through a channel based communication and engagement object of the enterprise data source upon conclusion of the established bidirectional communication between the remote user device and the enterprise data source.

12. The method of claim 1, wherein the one or more messages in the first secure bidirectional conversation between (i) the first remote user device and (ii) the enterprise data source associated with the communication channel comprises:

a first message posted by the enterprise data source, wherein the first message is associated with a first application programming interface token identifying a first user associated with the first remote user device.

13. The method of claim 12, wherein the communication channel further hosts one or more messages in a second secure bidirectional conversation between (i) a second remote user device associated with a second user and (ii) the enterprise data source, wherein the one or more messages in the second secure bidirectional conversation comprises:

a second message posted by the enterprise data source, wherein the second message is associated with the second application programming interface token identifying the second user associated with the second remote user device, and wherein the method further comprises:

using the first application programming interface token to route the first message to the first remote user device within the communication channel; and using the second application programming interface token to route the second message to the second remote user device within the communication channel.

14. The method of claim 1, wherein the communication channel hosts five or more conversations, each conversation between the enterprise data source and a different user in the plurality of users associated with the communication channel.

15. The method of claim 1, wherein the communication channel hosts 100 or more conversations, each conversation between the enterprise data source and a different user in the plurality of users associated with the communication channel.

16. The method of claim 1, wherein the communication channel facilitates electronic payment processing, customer sign-up, marketing messages or campaigns, or customer service.

17. The method of claim 13, the method further comprising:

using an automated human interface module to parse a reply from the first user to the first message, wherein when the automated human interface module is unable to find a matching response to the reply from the first user, the automated human interface module refers the first user to a human operator associated with the communication channel, and when the automated human interface module is able to find a matching response to the reply from the first user, the automated human interface module provides the matching response to the first user by providing the matching response along with the first application programming interface token identifying the first user associated with the first remote user device.

18. The method of claim 13, the method further comprising:

receiving a location of a second remote user device associated with a second user within the communication channel;

determining whether the location is within a geographical zone in a plurality of geographical zones, wherein when the location is within a geographical zone in the geographical plurality of zones, the method further comprises:
    communicating information from the enterprise data source to the remote user device associated with the second user within the communication channel based, at least in part, on the location; and
when the location is not within a geographical zone in the geographical plurality of zones, the method further comprises:
    communicating no information from the enterprise data source to the remote user device associated with the second user within the communication channel.

19. A non-transitory computer readable storage medium for channel based communication and engagement, wherein the non-transitory computer readable storage medium stores instructions, which when executed by a device comprising one or more processors, cause the one or more processors to perform a method comprising:
  (A) responsive to a search query received from a first remote user device associated with a first user, retrieving a channel based communication and engagement object comprising a communication channel of an enterprise data source that facilitates electronic communication between the enterprise data source and a plurality of users,
  (B) integrating the retrieved channel based communication and engagement object into an advertising unit of a data source;
  (C) rendering the advertising unit comprising the integrated channel based communication and engagement object on a display page rendered by the data source to a display of the first remote user device; and
  (D) responsive to a selection of the advertising unit by a first user, in the plurality of users, wherein the first user is associated with the first remote user device, establishing a first secure bidirectional conversation comprising an exchange of one or more messages between the first remote user device and the enterprise data source through the communication channel of the enterprise data source,
wherein the one or more messages in the first secure bidirectional conversation between (i) the first remote user device and (ii) the enterprise data source associated with the communication channel comprises:
  a first message posted by the enterprise data source, wherein the first message is associated with a first application programming interface token identifying the first user.

20. A computer system for channel based communication and engagement comprising:
  one or more processors;
  memory;
  one or more programs stored in the memory for execution by the one or more processors, the one or more programs comprising instructions for:
  (A) responsive to a search query received from a first remote user device associated with a first user, retrieving a channel based communication and engagement object comprising a communication channel of an enterprise data source that facilitates electronic communication between the enterprise data source and a plurality of users,
  (B) integrating the retrieved channel based communication and engagement object into an advertising unit of a data source;
  (C) rendering the advertising unit comprising the integrated channel based communication and engagement object on a display page rendered by the data source to a display of the first remote user device; and
  (D) responsive to a selection of the advertising unit by a first user, in the plurality of users, wherein the first user is associated with the first remote user device, establishing a first secure bidirectional conversation comprising an exchange of one or more messages between the first remote user device and the enterprise data source through the communication channel of the enterprise data source,
wherein the one or more messages in the first secure bidirectional conversation between (i) the first remote user device and (ii) the enterprise data source associated with the communication channel comprises:
  a first message posted by the enterprise data source, wherein the first message is associated with a first application programming interface token identifying the first user.

* * * * *